United States Patent
Flügge et al.

(10) Patent No.: US 9,292,724 B1
(45) Date of Patent: Mar. 22, 2016

(54) HAND HELD SYMBOLOGY READER ILLUMINATION DIFFUSER WITH AIMER OPTICS

(71) Applicants: Kai Flügge, Aachen (DE); Laurens Nunnink, Simpelveld (NL)

(72) Inventors: Kai Flügge, Aachen (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 13/971,320

(22) Filed: Aug. 20, 2013

Related U.S. Application Data

(63) Continuation-in-part of application No. 13/623,367, filed on Sep. 20, 2012, which is a continuation of application No. 12/573,402, filed on Oct. 5, 2009, now Pat. No. 8,286,878, which is a continuation of application No. 11/014,478, filed on Dec. 16, 2004, now Pat. No. 7,617,984, said application No. 13/971,320 is a continuation-in-part of application No. 12/900,617, filed on Oct. 8, 2010, which is a continuation of application No. 11/257,411, filed on Oct. 24, 2005, now Pat. No. 7,874,487.

(51) Int. Cl.
*G06K 7/10* (2006.01)

(52) U.S. Cl.
CPC .................................. *G06K 7/10831* (2013.01)

(58) Field of Classification Search
USPC .................................................... 235/472.01
See application file for complete search history.

(56) References Cited

U.S. PATENT DOCUMENTS

| | | |
|---|---|---|
| 2,357,378 A | 9/1944 | Benford |
| 3,726,998 A | 4/1973 | Szpak |
| 3,857,626 A | 12/1974 | Rosenberger |
| 3,961,198 A | 6/1976 | Aungst |
| 4,240,748 A | 12/1980 | Blanc |
| 4,282,425 A | 8/1981 | Chadima |
| 4,570,057 A | 2/1986 | Chadima |

(Continued)

FOREIGN PATENT DOCUMENTS

| | | |
|---|---|---|
| CN | 1426570 A | 6/2003 |
| DE | 3737792 A1 | 5/1989 |

(Continued)

OTHER PUBLICATIONS

PCT International Search Report and Written Opinion, PCT/US2004/034389, May 2, 2005.

(Continued)

*Primary Examiner* — Jamara Franklin
(74) *Attorney, Agent, or Firm* — Quarles & Brady LLP

(57) ABSTRACT

An imager defines a field of view and an optical axis. An illuminator directs illumination towards a region of interest, the region of interest being an intended position of the object. A tapered translucent diffuser is concentrically aligned with the optical axis, and has a first distal end proximate to the imager, and a second distal end proximate to the region of interest. The tapered translucent diffuser includes a darkened region, the darkened region to absorb a portion of the illumination to substantially reduce reflection of the portion of the illumination toward the object. A light guide can be positioned proximate the first distal end and the imager, such that a second illuminator can generate an aimer beam that passes through the light guide to produce an aimer pattern on the object.

22 Claims, 17 Drawing Sheets

(56) References Cited

U.S. PATENT DOCUMENTS

| | | |
|---|---|---|
| 4,743,773 A | 5/1988 | Katana |
| 4,766,300 A | 8/1988 | Chadima |
| 4,820,911 A | 4/1989 | Arackellian |
| 4,894,523 A | 1/1990 | Chadima, Jr. |
| 4,929,053 A | 5/1990 | Muller-Stute et al. |
| 4,969,037 A | 11/1990 | Poleschinski |
| 5,019,699 A | 5/1991 | Koenck |
| 5,149,948 A | 9/1992 | Chisholm |
| 5,177,346 A | 1/1993 | Chisholm |
| 5,202,817 A | 4/1993 | Koenck |
| 5,227,614 A | 7/1993 | Danielson |
| 5,239,169 A | 8/1993 | Thomas |
| 5,258,606 A | 11/1993 | Chadima, Jr. |
| 5,291,009 A | 3/1994 | Roustaei |
| 5,309,277 A | 5/1994 | Deck |
| 5,313,373 A | 5/1994 | Bjorner |
| 5,319,182 A | 6/1994 | Havens |
| 5,331,176 A | 7/1994 | Sant' Anselmo |
| 5,349,172 A | 9/1994 | Roustaei |
| 5,354,977 A | 10/1994 | Roustaei |
| 5,359,185 A | 10/1994 | Hanson |
| 5,367,439 A | 11/1994 | Mayer |
| 5,374,817 A | 12/1994 | Bard |
| 5,378,883 A | 1/1995 | Batterman |
| 5,393,967 A | 2/1995 | Rice et al. |
| 5,406,060 A | 4/1995 | Gitin |
| 5,408,084 A | 4/1995 | Brandorff |
| 5,414,251 A | 5/1995 | Durbin |
| 5,422,472 A | 6/1995 | Tavislan |
| 5,430,285 A | 7/1995 | Karpen |
| 5,434,618 A | 7/1995 | Hayashi |
| 5,442,247 A | 8/1995 | Suzuki |
| 5,449,892 A | 9/1995 | Yamada |
| 5,461,417 A | 10/1995 | White |
| 5,463,214 A | 10/1995 | Longacre, Jr. |
| 5,469,294 A | 11/1995 | Wilt |
| 5,481,098 A | 1/1996 | Davis |
| 5,484,994 A | 1/1996 | Roustaei |
| 5,500,516 A | 3/1996 | Durbin |
| 5,504,317 A | 4/1996 | Takahashi |
| 5,504,367 A | 4/1996 | Arackellian |
| 5,513,264 A | 4/1996 | Wang |
| 5,514,858 A | 5/1996 | Ackley |
| 5,515,452 A | 5/1996 | Penkethman |
| 5,532,467 A | 7/1996 | Roustaei |
| 5,569,902 A | 10/1996 | Wood |
| 5,576,527 A | 11/1996 | Sawanobori |
| 5,585,616 A | 12/1996 | Roxby |
| 5,586,212 A | 12/1996 | McConica |
| 5,591,955 A | 1/1997 | Laser |
| 5,598,007 A | 1/1997 | Bunce |
| 5,606,160 A | 2/1997 | Tani |
| 5,619,029 A | 4/1997 | Roxby |
| 5,623,137 A | 4/1997 | Powers |
| 5,654,533 A | 8/1997 | Suzuki |
| 5,654,540 A | 8/1997 | Stanton |
| 5,659,167 A | 8/1997 | Wang |
| 5,684,290 A | 11/1997 | Arackellian |
| 5,690,417 A | 11/1997 | Polidor et al. |
| 5,696,321 A | 12/1997 | Igarashi |
| 5,697,699 A | 12/1997 | Seo |
| 5,703,348 A | 12/1997 | Suzuki |
| 5,715,095 A | 2/1998 | Hiratsuka |
| 5,723,868 A | 3/1998 | Hammond, Jr. |
| 5,734,153 A | 3/1998 | Swartz |
| 5,743,633 A | 4/1998 | Chau |
| 5,750,974 A | 5/1998 | Sasaki |
| 5,756,981 A | 5/1998 | Roustaei |
| 5,773,810 A | 6/1998 | Hussey |
| 5,777,314 A | 7/1998 | Roustaei |
| 5,780,834 A | 7/1998 | Havens |
| 5,783,811 A | 7/1998 | Feng |
| 5,786,586 A | 7/1998 | Pidhirny |
| 5,793,033 A | 8/1998 | Feng |
| 5,811,784 A | 9/1998 | Tausch |
| 5,821,518 A | 10/1998 | Sussmeier et al. |
| 5,834,754 A | 11/1998 | Feng |
| 5,859,418 A | 1/1999 | Li et al. |
| 5,861,910 A | 1/1999 | McGarry |
| 5,886,338 A | 3/1999 | Arackellian |
| 5,894,348 A | 4/1999 | Bacchi |
| 5,903,391 A | 5/1999 | Toshima |
| 5,907,148 A | 5/1999 | Iwafuchi |
| 5,919,057 A | 7/1999 | Kameyama |
| 5,920,643 A | 7/1999 | White |
| 5,923,020 A | 7/1999 | Kurokawa |
| 5,949,057 A | 9/1999 | Feng |
| 5,949,763 A | 9/1999 | Lund |
| 5,969,321 A | 10/1999 | Danielson |
| 5,979,763 A | 11/1999 | Wang |
| 5,984,494 A | 11/1999 | Chapman |
| 5,992,751 A | 11/1999 | Laser |
| 6,011,586 A | 1/2000 | Lepior |
| 6,022,124 A | 2/2000 | Bourn |
| 6,033,090 A | 3/2000 | Seo |
| 6,034,379 A | 3/2000 | Bunte |
| 6,036,095 A | 3/2000 | Seo |
| 6,039,254 A | 3/2000 | Froese-Peeck |
| 6,039,255 A | 3/2000 | Seo |
| 6,042,012 A | 3/2000 | Olmstead |
| 6,045,047 A | 4/2000 | Pidhirny |
| 6,060,722 A | 5/2000 | Havens |
| 6,065,678 A | 5/2000 | Li |
| 6,073,852 A | 6/2000 | Seo |
| 6,105,869 A | 8/2000 | Scharf |
| 6,119,939 A | 9/2000 | Schwartz |
| 6,141,046 A | 10/2000 | Roth |
| 6,158,661 A | 12/2000 | Chadima, Jr. |
| 6,164,544 A | 12/2000 | Schwartz |
| 6,210,013 B1 | 4/2001 | Bousfield |
| 6,223,986 B1 | 5/2001 | Bobba |
| 6,234,397 B1 | 5/2001 | He |
| 6,247,645 B1 | 6/2001 | Harris |
| 6,249,008 B1 | 6/2001 | Bunte |
| 6,250,551 B1 | 6/2001 | He |
| 6,260,763 B1 | 7/2001 | Svetal |
| 6,267,294 B1 | 7/2001 | Stern |
| 6,283,374 B1 | 9/2001 | Fantone |
| 6,330,974 B1 | 12/2001 | Ackley |
| 6,340,114 B1 | 1/2002 | Correa |
| 6,341,878 B1 | 1/2002 | Chiang |
| 6,347,163 B2 | 2/2002 | Roustaei |
| 6,347,874 B1 | 2/2002 | Boyd |
| 6,352,204 B2 | 3/2002 | Hattersley |
| 6,360,948 B1 | 3/2002 | Yang |
| 6,371,374 B1 | 4/2002 | Schwartz |
| 6,385,352 B1 | 5/2002 | Roustaei |
| 6,385,507 B1 | 5/2002 | Buijtels |
| 6,394,349 B1 | 5/2002 | Shigekusa |
| 6,405,925 B2 | 6/2002 | He |
| 6,407,810 B1 | 6/2002 | Liu |
| 6,429,934 B1 | 8/2002 | Dunn |
| 6,435,411 B1 | 8/2002 | Massieu |
| 6,491,223 B1 | 12/2002 | Longacre, Jr. |
| 6,505,778 B1 | 1/2003 | Reddersen |
| 6,513,714 B1 | 2/2003 | Davis |
| 6,542,238 B1 | 4/2003 | Tsuboi et al. |
| 6,547,146 B1 | 4/2003 | Meksavan |
| 6,575,367 B1 | 6/2003 | Longacre, Jr. |
| 6,581,838 B1 | 6/2003 | Meksavan |
| 6,592,040 B2 | 7/2003 | Barkan |
| 6,595,422 B1 | 7/2003 | Doljack |
| 6,598,797 B2 | 7/2003 | Lee |
| 6,601,768 B2 | 8/2003 | McCall |
| 6,607,128 B1 | 8/2003 | Jovanvoski |
| 6,607,132 B1 | 8/2003 | Dvorkis |
| 6,621,065 B1 | 9/2003 | Fukumoto |
| 6,659,350 B2 | 12/2003 | Schwartz |
| 6,661,521 B1 | 12/2003 | Stern |
| 6,681,037 B1 | 1/2004 | Koljonen |
| 6,689,998 B1 | 2/2004 | Bremer |
| 6,729,546 B2 | 5/2004 | Roustaei |
| 6,760,165 B2 | 7/2004 | Wulff |
| 6,803,088 B2 | 10/2004 | Kaminsky |

(56) References Cited

U.S. PATENT DOCUMENTS

| | | |
|---|---|---|
| 6,809,847 B2 | 10/2004 | McQueen |
| 6,831,290 B2 | 12/2004 | Mentzer |
| 6,832,725 B2 | 12/2004 | Gardiner |
| 6,854,650 B2 | 2/2005 | Hattersley |
| 6,860,428 B1 | 3/2005 | Dowling |
| 6,914,679 B2 | 7/2005 | Nettekoven |
| 7,021,542 B2 | 4/2006 | Patel |
| 7,025,271 B2 | 4/2006 | Dvorkis |
| 7,025,272 B2 | 4/2006 | Yavid |
| 7,025,273 B2 | 4/2006 | Breytman |
| 7,025,572 B2 | 4/2006 | Miyagawa |
| 7,038,853 B2 | 5/2006 | Li |
| 7,044,377 B2 | 5/2006 | Patel |
| 7,090,132 B2 | 8/2006 | Havens |
| 7,128,266 B2 | 10/2006 | Zhu |
| 7,131,587 B2 | 11/2006 | He |
| 7,159,764 B1 | 1/2007 | White |
| 7,163,149 B2 | 1/2007 | He |
| 7,180,052 B1 | 2/2007 | Barkan |
| 7,187,825 B2 | 3/2007 | Lim |
| 7,204,418 B2 | 4/2007 | Joseph |
| 7,204,420 B2 | 4/2007 | Barkan |
| 7,224,540 B2 | 5/2007 | Olmstead |
| 7,225,989 B2 | 6/2007 | Zhu |
| 7,240,844 B2 | 7/2007 | Zhu |
| 7,253,384 B2 | 8/2007 | Barnes |
| 7,267,282 B2 | 9/2007 | Zhu |
| 7,270,274 B2 | 9/2007 | Hennick |
| 7,278,575 B2 | 10/2007 | Zhu |
| 7,281,661 B2 | 10/2007 | Zhu |
| 7,296,749 B2 | 11/2007 | Massieu |
| 7,299,310 B2 | 11/2007 | Aschenbrenner |
| 7,306,155 B2 | 12/2007 | Hennick |
| 7,314,173 B2 | 1/2008 | Philyaw |
| 7,331,524 B2 | 2/2008 | Vinogradov |
| 7,360,705 B2 | 4/2008 | Heinrich |
| 7,451,917 B2 | 11/2008 | McCall |
| 7,490,774 B2 | 2/2009 | Zhu |
| 7,520,434 B2 | 4/2009 | Jolivet |
| 7,568,628 B2 | 8/2009 | Wang |
| 7,604,174 B2 | 10/2009 | Gerst, III |
| 7,617,984 B2 | 11/2009 | Nunnink |
| 7,793,017 B2 | 9/2010 | Gehring |
| 7,823,783 B2 | 11/2010 | Gerst, III |
| 7,823,789 B2 | 11/2010 | Nunnink |
| 7,861,037 B2 | 12/2010 | McAvoy |
| 7,874,487 B2 | 1/2011 | Nunnink et al. |
| RE42,337 E | 5/2011 | Ward |
| 7,967,632 B2 | 6/2011 | Kiryu |
| 8,061,613 B2 | 11/2011 | Gerst, III |
| 8,061,614 B2 | 11/2011 | Gerst, III |
| 8,069,289 B2 | 11/2011 | Hafer |
| 8,286,878 B2 | 10/2012 | Nunnink |
| 2001/0026301 A1 | 10/2001 | Fukazawa et al. |
| 2001/0027999 A1 | 10/2001 | Lee |
| 2002/0000472 A1 | 1/2002 | Hattersley et al. |
| 2002/0030094 A1 | 3/2002 | Curry et al. |
| 2002/0074403 A1 | 6/2002 | Krichever et al. |
| 2002/0080187 A1 | 6/2002 | Lawton |
| 2002/0096566 A1 | 7/2002 | Schwartz et al. |
| 2002/0104887 A1 | 8/2002 | Schlieffers et al. |
| 2002/0125322 A1 | 9/2002 | McCall et al. |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1 | 5/2003 | Patel et al. |
| 2003/0163623 A1 | 8/2003 | Yeung |
| 2004/0069855 A1 | 4/2004 | Patel et al. |
| 2004/0156539 A1 | 8/2004 | Jansson et al. |
| 2004/0217173 A1 | 11/2004 | Lizotte et al. |
| 2004/0238637 A1 | 12/2004 | Russell et al. |
| 2005/0029439 A1 | 2/2005 | Benedict |
| 2005/0045725 A1 | 3/2005 | Gurevich et al. |
| 2005/0047723 A1 | 3/2005 | Li |
| 2005/0087601 A1 | 4/2005 | Gerst, III et al. |
| 2005/0117144 A1 | 6/2005 | Greenway et al. |
| 2005/0180037 A1 | 8/2005 | Masterson |
| 2005/0199725 A1 | 9/2005 | Craen et al. |
| 2006/0027657 A1 | 2/2006 | Ninnink et al. |
| 2006/0027659 A1 | 2/2006 | Patel et al. |
| 2006/0032921 A1 | 2/2006 | Gerst, III et al. |
| 2006/0060653 A1 | 3/2006 | Wittenberg et al. |
| 2006/0131419 A1 | 6/2006 | Nunnink |
| 2006/0133757 A1 | 6/2006 | Nunnink |
| 2006/0266840 A1 | 11/2006 | Vinogradov et al. |
| 2007/0090193 A1 | 4/2007 | Nunnink et al. |
| 2007/0091332 A1 | 4/2007 | Nunnink |
| 2007/0152064 A1 | 7/2007 | Nunnink et al. |
| 2007/0206183 A1 | 9/2007 | Lebens |
| 2008/0170380 A1 | 7/2008 | Pastore |

FOREIGN PATENT DOCUMENTS

| | | |
|---|---|---|
| DE | 4003983 C1 | 8/1991 |
| DE | 3931044 C2 | 1/1992 |
| DE | 4123916 A1 | 1/1992 |
| DE | 10026301 A1 | 11/2001 |
| DE | 10113426 A1 | 9/2002 |
| EP | 0185782 B1 | 3/1989 |
| EP | 0356680 A1 | 3/1990 |
| EP | 0524029 | 1/1993 |
| EP | 1158460 A2 | 11/2001 |
| EP | 1687752 | 2/2008 |
| JP | S5362387 A | 6/1978 |
| JP | 59163677 A | 9/1984 |
| JP | S6134681 A | 2/1986 |
| JP | 6318209 A | 1/1988 |
| JP | 02100580 A | 4/1990 |
| JP | 0353784 A | 3/1991 |
| JP | 04223583 A | 8/1992 |
| JP | 06124361 A | 5/1994 |
| JP | 6139398 | 5/1994 |
| JP | 07271890 A | 10/1995 |
| JP | 08129597 A | 5/1996 |
| JP | 8510053 | 10/1996 |
| JP | 08287176 A | 11/1996 |
| JP | 0962831 A | 3/1997 |
| JP | 10134133 A | 5/1998 |
| JP | 11312898 | 11/1999 |
| JP | 2000231600 A | 8/2000 |
| JP | 2001043301 A | 2/2001 |
| JP | 2001307011 A | 11/2001 |
| JP | 2002525644 | 8/2002 |
| JP | 2003503701 A | 1/2003 |
| JP | 2004127215 A | 4/2004 |
| JP | 2005122355 A | 5/2005 |
| JP | 2007028088 A | 2/2007 |
| JP | 2007546762 | 11/2007 |
| JP | 2008524709 A | 7/2008 |
| WO | 9112489 A1 | 8/1991 |
| WO | 9216909 A1 | 10/1992 |
| WO | 9419908 A1 | 9/1994 |
| WO | 9949347 A1 | 9/1999 |
| WO | 0016073 A1 | 3/2000 |
| WO | 0101118 A1 | 1/2001 |
| WO | 0163258 A1 | 8/2001 |
| WO | 0165469 A1 | 9/2001 |
| WO | 02075637 A1 | 9/2002 |
| WO | 2004006438 A2 | 1/2004 |
| WO | 2005043449 A1 | 5/2005 |

OTHER PUBLICATIONS

PCT International Search Report and Written Opinion, PCT/US2004/034872, Feb. 24, 2005.
PCT International Search Report, PCT/US2005/044452, Mar. 20, 2006.
PCT International Search Report and Written Opinion, PCT/US2005/044466, Apr. 12, 2006.

(56) References Cited

OTHER PUBLICATIONS

PCT International Search Report and Written Opinion, PCT/US2006/041041, May 25, 2007.
Japan Patent Office, Notification of Reasons for Refusal, Application No. 2006-536784, Oct. 6, 2009.
German Patent and Trademark Office, Official Action, Application No. 102 91 122.3, Apr. 29, 2010.
German Patent and Trademark Office, Official Action, Application No. 102 91 122.3, Mar. 14, 2013.
State Intellectual Property Office, P.R. China, First Office Action, Application No. 200680048666.8, Mar. 19, 2010.
German Patent and Trademark Office, Official Action, Application No. 11 2006 002 867.7, Jan. 23, 2013.
U.S. Patent Office Notice of Allowance for U.S. Appl. No. 10/911,989, pp. 1-7, dated Jun. 3, 2009.
U.S. Patent Office Non-Final Office Action for U.S. Appl. No. 10/911,989, pp. 1-11, dated Oct. 17, 2008.
U.S. Patent Office Final Office Action for U.S. Appl. No. 10/911,989, pp. 1-11, dated Sep. 26, 2007.
U.S. Patent Office Non-Final Office Action for U.S. Appl. No. 10/911,989, pp. 1-11, dated Feb. 21, 2007.
U.S. Patent Office Notice of Allowance for U.S. Appl. No. 10/693,626, pp. 1-7, dated Dec. 21, 2009.
U.S. Patent Office Final Office Action for U.S. Appl. No. 10/693,626, pp. 1-17, dated Feb. 22, 2008.
U.S. Patent Office Non-Final Office Action for U.S. Appl. No. 10/693,626, pp. 1-9, dated Jul. 26, 2007.
U.S. Patent Office Final Office Action for U.S. Appl. No. 10/693,626, pp. 1-10, dated Dec. 1, 2006.
U.S. Patent Office Non-Final Office Action for U.S. Appl. No. 10/693,626, pp. 1-9, dated Jun. 15, 2006.
U.S. Patent Office Non-Final Office Action for U.S. Appl. No. 10/693,626, pp. 1-9, dated Dec. 13, 2005.
U.S. Patent Office Non-Final Office Action for U.S. Appl. No. 10/693,626, pp. 1-9, dated Jun. 28, 2005.
U.S. Patent Office Non-Final Office Action for U.S. Appl. No. 10/693,626, pp. 1-11, dated Oct. 17, 2008.
U.S. Patent Office Notice of Allowance for U.S. Appl. No. 11/019,763, pp. 1-6, dated Aug. 11, 2009.
U.S. Patent Office Ex Parte Quayle Action for U.S. Appl. No. 11/019,763, pp. 1-5, dated Apr. 16, 2009.
U.S. Patent Office Notice of Allowance for U.S. Appl. No. 11/019,763, pp. 1-6, dated Nov. 5, 2008.
U.S. Patent Office Non-Final Office Action for U.S. Appl. No. 11/019,763, pp. 1-6, dated Apr. 11, 2008.
U.S. Patent Office Final Office Action for U.S. Appl. No. 11/019,763, pp. 1-8, dated Nov. 27, 2007.
U.S. Patent Office Non-Final Office Action for U.S. Appl. No. 11/019,763, pp. 1-7, dated Jun. 12, 2007.
U.S. Patent Office Notice of Allowance for U.S. Appl. No. 11/322,370, pp. 1-7, dated Dec. 2, 2009.
U.S. Patent Office Notice of Allowance for U.S. Appl. No. 11/322,370, pp. 1-8, dated Jun. 30, 2009.
U.S. Patent Office Non-Final Office Action for U.S. Appl. No. 11/322,370, pp. 1-11, dated Nov. 25, 2008.
U.S. Patent Office Examiner Interview Summary for U.S. Appl. No. 11/322,370, pp. 1-2, dated Nov. 13, 2008.
U.S. Patent Office Final Office Action for U.S. Appl. No. 11/322,370, pp. 1-8, dated Sep. 5, 2008.
U.S. Patent Office Non-Final Office Action for U.S. Appl. No. 11/322,370, pp. 1-7, dated Jan. 7, 2008.
U.S. Patent Office Examiner Interview Summary for U.S. Appl. No. 11/322,370, p. 1, dated Dec. 3, 2007.
U.S. Patent Office Final Office Action for U.S. Appl. No. 11/322,370, pp. 1-9, dated Oct. 4, 2007.
U.S. Patent Office Non-Final Office Action for U.S. Appl. No. 11/322,370, pp. 1-10, dated Mar. 6, 2007.
U.S. Patent Office Notice of Allowance for U.S. Appl. No. 11/014,478, 6 pages, dated Jul. 1, 2009.
U.S. Patent Office Non-Final Office Action for U.S. Appl. No. 11/014,478, pp. 1-8, dated Jan. 24, 2006.
U.S. Patent Office Notice of Allowance for U.S. Appl. No. 11/321,702, 7 pages, dated Jun. 25, 2009.
U.S. Patent Office Non-Final Office Action for U.S. Appl. No. 11/321,702, pp. 1-7, dated Jun. 25, 2008.
U.S. Patent Office Notice of Allowance for U.S. Appl. No. 12/573,402, 9 pages, dated Jun. 6, 2012.
U.S. Patent Office Non-Final Office Action for U.S. Appl. No. 12/573,402, pp. 1-11, dated Apr. 5, 2011.
U.S. Patent Office Non-Final Office Action for U.S. Appl. No. 12/573,402, pp. 1-8, dated Sep. 22, 2010.
U.S. Patent Office Non-Final Office Action for U.S. Appl. No. 12/573,402, pp. 1-8, dated May 25, 2010.
U.S. Patent Office Non-Final Office Action for U.S. Appl. No. 11/257,411, pp. 1-5, Nov. 6, 2009.
U.S. Patent Office Non-Final Office Action for U.S. Appl. No. 11/257,411, pp. 1-6, Feb. 23, 2009.
Cognex Corporation, AcuReader/OCR, Accurate, Fast Water Identification, 1995-1996.
Cognex Corporation, 50mm Ring Light Image Formation System, for the In-Sight 5000 Series ID Readers, 2006.
Vision-Supplies.com, Siemens LytePipe 1.5 × 30, 1999.
CCS Inc., LFX-series Lights, http://www.ccs-inc.co.jp/cgi-bin/hp.cgi?menu=102-115-01e, Feb. 12, 2009.
Cognex Corporation, DataMan 6500 Series, Quick Reference, 2004.
Cognex Corporation, DataMan 7500 Series, Handheld Models, Cognex Machine Vision System and Machine Vision Sensors, 2009.
InData Systems, 4410LDS Hand Held Etched 2D Image Reader, 27 Fennell Street, Skaneateles, NY, 13152, www.indatasys.com., Jan. 1, 2005.
Cognex Corporation, Diffuse Ring Light Installation Instructions, In-Sight, 2006.
Cognex Corporation, DataMan Handheld ID Readers, 2005.
Cognex Corporation, DataMan 6500 Series, Quick Reference Guide, Aug. 2004.
Japan Patent Office, Notification of Reason for Rejection, Patent Application No. 2008-537,812, Feb. 28, 2012.

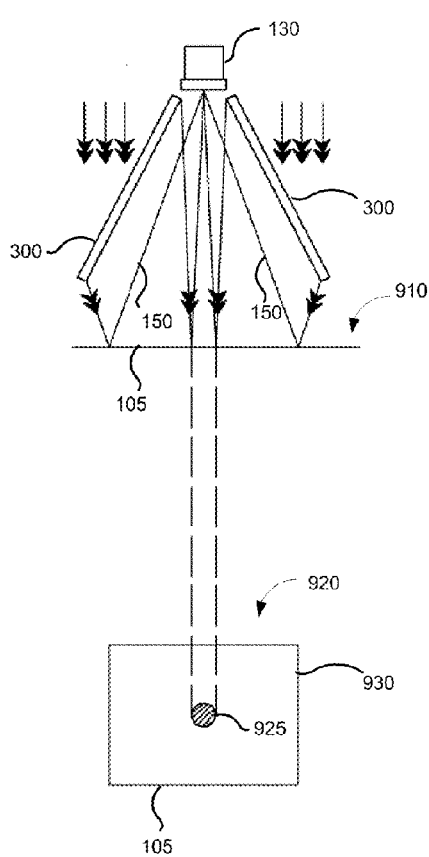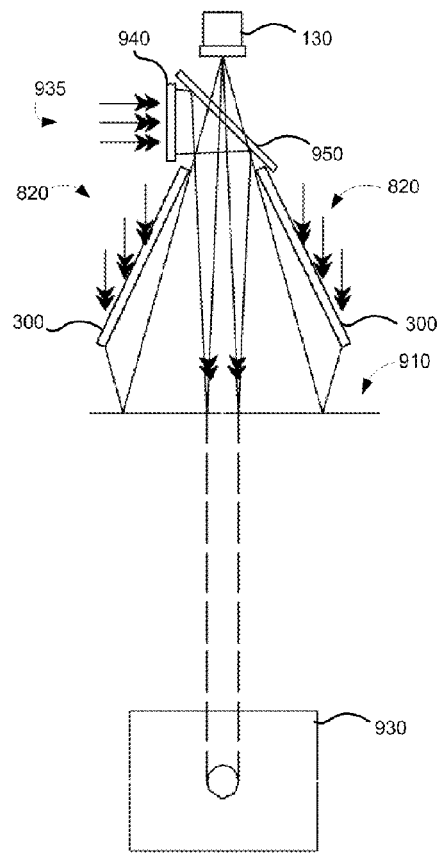
FIG. 12
FIG. 13

HAND HELD SYMBOLOGY READER ILLUMINATION DIFFUSER WITH AIMER OPTICS

CROSS-REFERENCE TO RELATED APPLICATIONS

This application is a continuation-in-part of co-pending U.S. patent application Ser. No. 13/623,367, filed Sep. 20, 2012 and entitled "Hand Held Symbology Reader Illumination Diffuser," which is a continuation of U.S. patent application Ser. No. 12/573,402, filed Oct. 5, 2009, now U.S. Pat. No. 8,286,878, and entitled "Hand Held Symbology Reader Illumination Diffuser," which is a continuation of U.S. patent application Ser. No. 11/014,478, filed Dec. 16, 2004, now U.S. Pat. No. 7,617,984, each of which are incorporated herein by reference.

This application is also continuation-in-part of co-pending U.S. patent application Ser. No. 12/900,617, filed Oct. 8, 2010 and entitled "Integrated Illumination Assembly For Symbology Reader," which is a continuation of U.S. patent application Ser. No. 11/257,411, filed Oct. 24, 2005, now U.S. Pat. No. 7,874,487, and entitled "Integrated Illumination Assembly For Symbology Reader," each of which are incorporated herein by reference.

STATEMENT REGARDING FEDERALLY SPONSORED RESEARCH OR DEVELOPMENT

Not applicable.

BACKGROUND OF THE TECHNOLOGY

This technology relates to illumination for image acquisition devices, and more particularly, to illumination for image acquisition devices used for reading industrial identification codes.

Machine vision systems use image acquisition devices that include camera sensors to deliver information on a viewed subject. The system then interprets this information according to a variety of algorithms to perform a programmed decision-making and/or identification function. For an image to be most effectively acquired by a sensor in the visible, and near visible light range, the subject should be properly illuminated.

In the example of identification symbol scanning using an image sensor, good lighting is highly desirable. Identification symbol scanning entails the aiming of an image acquisition sensor (CMOS camera, CCD, etc.) at a location on an object that contains a bar code, data matrix, or other identification symbol, and retrieval of an image of that symbol. The identification symbol contains a set of predetermined patterns that represent an ordered group of characters or symbols from which an attached data processor (for example a microcomputer) can derive useful information about the object (e.g. its serial number, type, model, price, etc.). Identification symbols are available in a variety of shapes and sizes. Two of the most commonly employed symbol types are the so-called one-dimensional barcode, consisting a line of vertical stripes of varying width and spacing, and the so-called two-dimensional barcode consisting of a two-dimensional array of dots or rectangles.

In reading identification symbols or other subjects of interest, the type of illumination employed is of particular concern. Where barcodes and other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no less than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of an item or container.

Conversely, where a barcode or other subject is formed on a more-irregular surface or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

To take full advantage of the versatility of a camera image sensor, it is desirable to provide both bright field and dark field illumination for selective or simultaneous illumination of a subject. However, dark field illumination must be presented close to a subject to attain the low incidence angle thereto. Conversely, bright field illumination is better produced at a relative distance to ensure full area illumination.

In the situation where a barcode or other subject is formed on a specular surface, non-directional totally diffuse bright field illumination is preferred. This type of illumination, like that naturally produced on a cloudy day must surround the object upon which the barcode is placed. In typical machine vision applications, non-directional totally diffuse illumination is difficult and costly to provide, usually by way of surrounding a work piece with a light tent.

Other machine vision applications can use a dome or cone-shaped diffuser to provide the totally diffuse bright field illumination for specular surfaces. However, at least one small aperture, i.e., a viewport, in the dome or cone-shaped diffuser is needed for the camera lens and image sensor. On reflective surfaces, this aperture causes an undesirable dark spot in the background of the image, which can cause problems with the decision-making and/or identification function.

Furthermore, in some applications, an aimer pattern can be projected onto the object to identify an area of the field of view of the camera. To project this aimer pattern onto the object, an even larger aperture or an additional second aperture in the diffuser is required, causing a larger or a second unwanted dark spot. Alternatively, an aimer source can be placed outside the diffuser to eliminate a second hole, but in this case the aimer pattern would be substantially further away from a center of the field of view.

BRIEF SUMMARY OF THE TECHNOLOGY

The present embodiments overcomes the disadvantages of the prior art by providing In one aspect the present technology provides diffuse illumination in a hand held reader to produce high contrast images of symbols and barcodes. A tapered translucent diffuser is disposed between the imager and the region of interest with illumination behind the diffuser directed toward the region of interest. The tapered diffuser converts bright field illumination into totally diffused non-directional illumination. The narrow end of the tapered diffuser surrounds the lens at a position near to the lens of the reader. The wide end of the tapered diffuser surrounds the field of view near the region of interest. Accordingly, the field of view is flooded with diffuse illumination.

In another aspect of the technology, diffuse illumination is produced in addition to low angle dark field illumination. In this aspect of the technology, a passive light pipe that produces low angle dark field illumination is positioned around the diffuser. Alternatively, an active light pipe surrounds the diffuser, with dark field illuminators directly projecting illumination at a low angle with respect to the region of interest. The reader can be configured to selectively actuate either the diffuse illumination from the tapered diffuser, or exclusive dark field illumination from the dark field light pipes, or a combination of both diffuse illumination and dark field illumination.

In yet another aspect of the technology, in addition to the tapered diffuser that surrounds the lens at the narrow end of the diffuser, diffused illumination directed to a semi-transparent mirror positioned in front of the lens and aligned so that a portion of the light reflecting from the region of interest is projected into the lens, while a portion of the diffuse illumination is reflected onto the region of interest. In this aspect of the technology, uniform diffuse illumination can be projected onto the region of interest without producing a reflection of the lens in the image.

In another aspect of the technology, an apparatus for imaging a symbol on an object comprises a portable imaging system having an imager. The imager defines a field of view and an optical axis. An illuminator directs illumination towards a region of interest, the region of interest being an intended position of the symbol on the object. A tapered translucent diffuser is concentrically aligned with the optical axis, and has a first distal end proximate to the imager, and a second distal end proximate to the region of interest, the tapered translucent diffuser tapering along the length of the tapered translucent diffuser from the first end toward the second end. The tapered translucent diffuser includes a darkened section, the darkened section to absorb a portion of the illumination to substantially reduce reflection of the portion of the illumination toward the object.

In yet another aspect of the technology, an apparatus for imaging a symbol on an object comprises a portable imaging system having an imager. The imager defines a field of view and an optical axis. An illuminator directs illumination towards a region of interest, the region of interest being an intended position of the symbol on the object. A tapered translucent diffuser is concentrically aligned with the optical axis, and has a first distal end proximate to the imager, and a second distal end proximate to the region of interest, the tapered translucent diffuser tapering along the length of the tapered translucent diffuser from the first end toward the second end. A light guide is positioned proximate the first distal end and the imager, with a second illuminator to generate an aimer beam that passes through the light guide to produce an aimer pattern on the object.

In yet another aspect of the technology, an apparatus for imaging an object comprises a hand-held portable imaging system having an imager, the imager defining a field of view and an optical axis. A first illuminator directs illumination towards a region of interest, the region of interest being an intended position of the object. A tapered translucent diffuser is concentrically aligned with the optical axis, having a first distal end proximate to the imager, and a second distal end proximate to the region of interest, the tapered translucent diffuser tapering along the length of the tapered translucent diffuser from the first end toward the second end. The tapered translucent diffuser includes a darkened section, the darkened section to absorb a portion of the illumination to substantially reduce reflection of the portion of the illumination toward the object. A light guide is positioned proximate the first distal end and the imager, with a second illuminator to generate an aimer beam that passes through the light guide to produce an aimer pattern on the object.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIG. 12 is a schematic cross section of an illustrative embodiment of the present technology;

FIG. 13 is a schematic cross section of an illustrative embodiment of the present technology;

Figure 1:
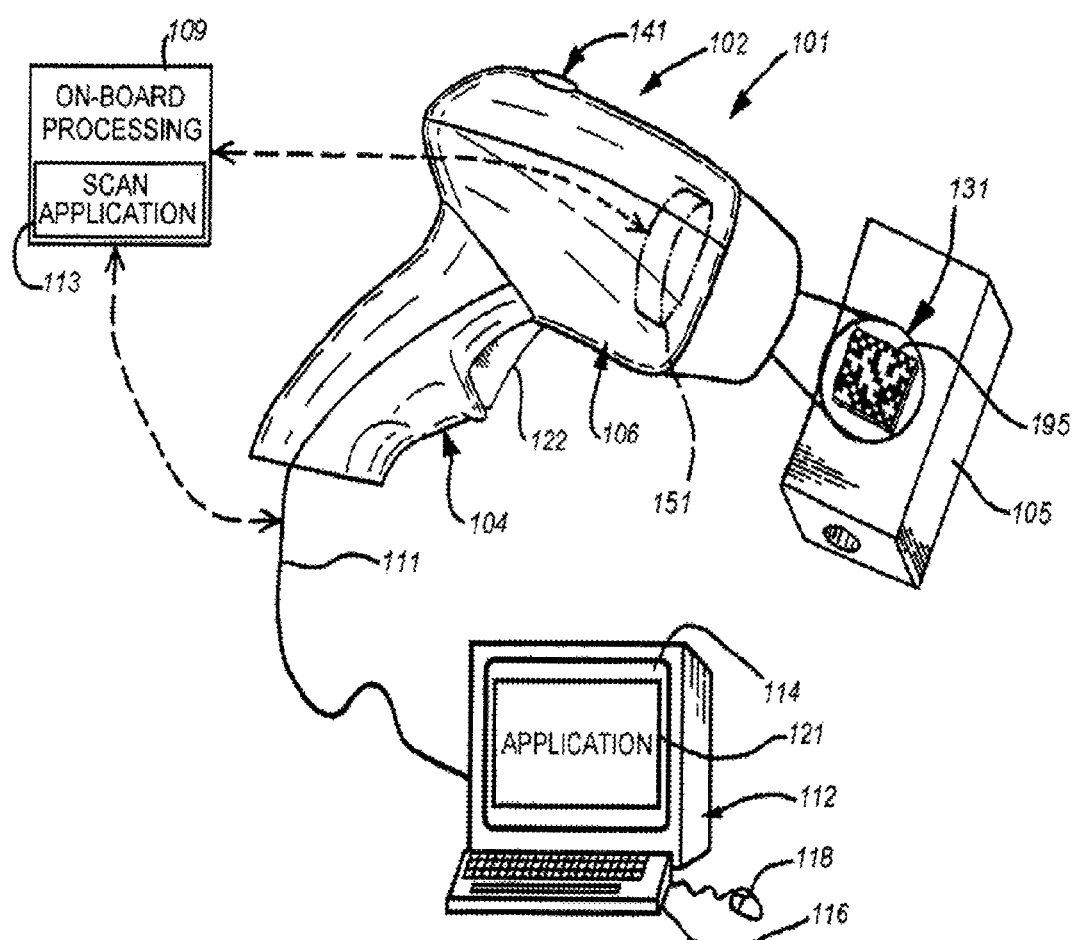
FIG. 1 is a perspective view of a handheld scanning system and an object having a symbol thereon.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

FIG. 1 shows a scanning system 101 adapted for handheld operation. An exemplary handheld scanning appliance or handpiece 102 is provided. It includes a grip section 104 and a body section 106. An image formation system 151, shown in phantom and described herein, can be controlled and can direct image data to an onboard embedded processor 109. This processor can include a scanning software application 113 by which lighting is controlled, images are acquired and image data is interpreted into usable information (for example, alphanumeric strings derived from the barcode images). The decoded information can be directed via a cable 111 to a PC or other data storage device 112 having (for example) a display 114, keyboard 116 and mouse 118, where it can be stored and further manipulated using an appropriate application 121. Alternatively, the cable 111 can be directly connected to an interface in the scanning appliance and an appropriate interface in the computer 112. In this case the computer-based application 121 performs various image interpretation and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (110, shown and described further below) acquires an image of a region of interest 131 on an object 105. The exemplary region of interest includes a two-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful read and decode of the symbol 195.

Figure 2:
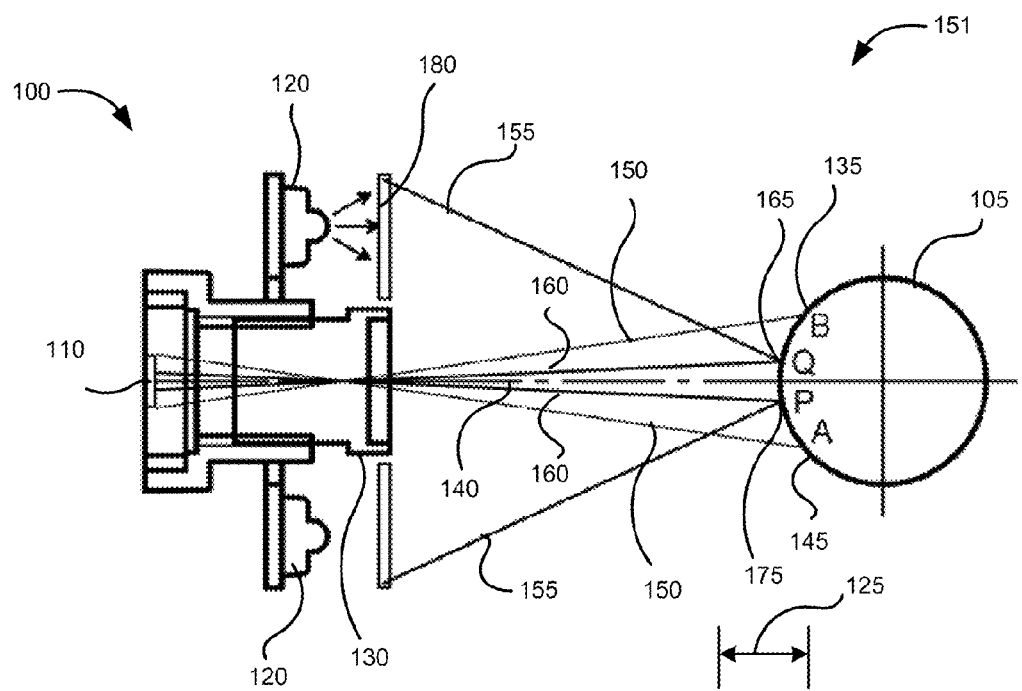
FIG. 2 is a schematic cross sectional view of an image formation system according to the background art.

FIG. 2 depicts an image formation system 151 typically used in a hand held scanning appliance 102. FIG. 2 shows a cross sectional view of a prior art imaging system 100 for reading marks or symbols on an object 105. The imaging system 100 has an imager 110 that is one of a variety of types of photosensitive imaging sensors, such as a CMOS or CCD device. A lens 130 disposed in front of the imager 110 is configured to direct illumination onto the imager 110. The imager 110 and lens 130 together form an optical axis 140 that defines the center of a field of view, which is bound by the polyhedral volume defined as lines 150 in FIG. 2.

At a given focus setting, a sharply focused image of the surface of an object 105 will be projected by the lens 130 onto the imager 110 when the object is positioned at an appropriate distance from the imaging system 100. Optical properties of the system will affect the range of distance from which the object 105 can be positioned in front of the system 100 while projecting an image of the object 105 onto the imager 110 that exhibits features of sufficient sharpness and contrast so as to be perceived as a focused image. The range upon which a focused image can be formed on the imager 110 is a called the depth of field 125.

Illuminators 120 are shown in the system 100 for directing illumination towards the object 105. Typically, a diffuser 180 is disposed in front of the illuminators 120 to diffuse the illumination so that a uniform distribution of illumination can be spread over the surface of the object. Without the diffuser 180, the illumination from the illuminators 120 will appear as areas of high intensity illumination surrounded by areas of low intensity illumination. As shown in FIG. 2, the field of view of an image of a cylindrical object 105 is the portion of the surface of the object from point B 135 to point A 145.

Although the entire field of view is illuminated, only a portion of the reflective surface (from point P 175 to point Q 165) will reflect light into the imaging system 100. This results from the maximum angle of illumination, depicted as lines 155 in FIG. 2, that can be reflected into the imaging system 100, depicted as lines 160 in FIG. 2, being significantly less than the field of view. The image of a cylindrical object using the prior art imaging system 100 will depict a brightly illuminated band over the area defined by lines through points P and Q.

Figure 3:
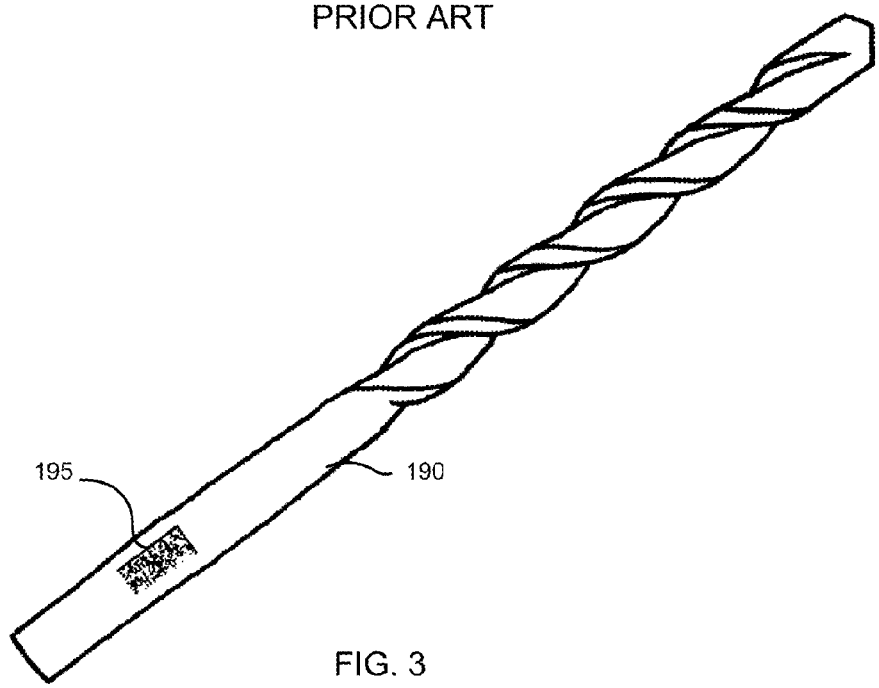
FIG. 3 is a perspective view of a representative object having a two-dimensional symbol marked thereon, according to the background art.
Figure 4:
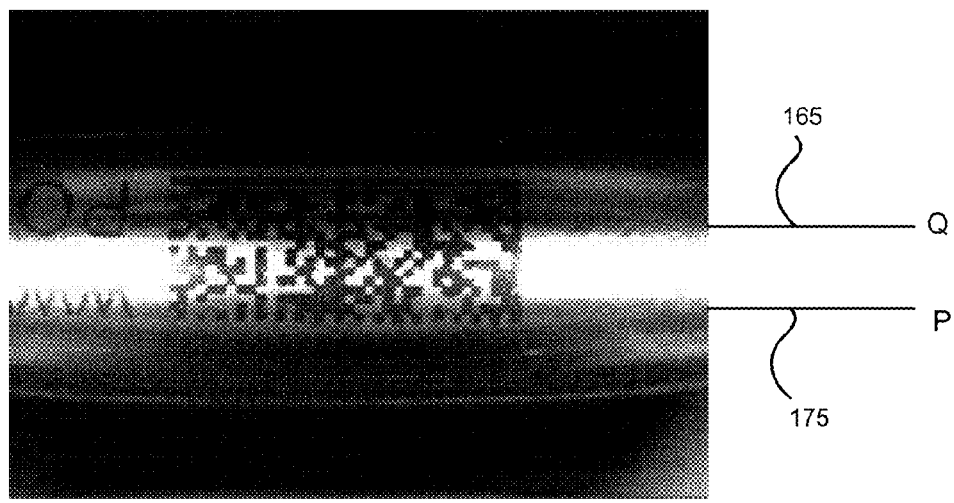
FIG. 4 is an image of a two dimensional symbol on a specular cylindrical object acquired using an image formation system according to the background art.

FIG. 3 depicts a two-dimensional data matrix symbol 195 etched on the surface of a cylindrical object, e.g., a drill bit 190. Presenting the exemplary drill bit 190 to the imaging system 100 will produce an image of the symbol 195 as shown in FIG. 4. A brightly illuminated band can be observed between the regions defined as lines P 175 and Q 165. The illumination that strikes the remaining portion of the object does not reflect into the optics of the imaging system 100, and therefore, the image is too dark to produce a clear representation of the data matrix symbol so that decoding algorithms can be applied to decode the symbol.

Figure 5:
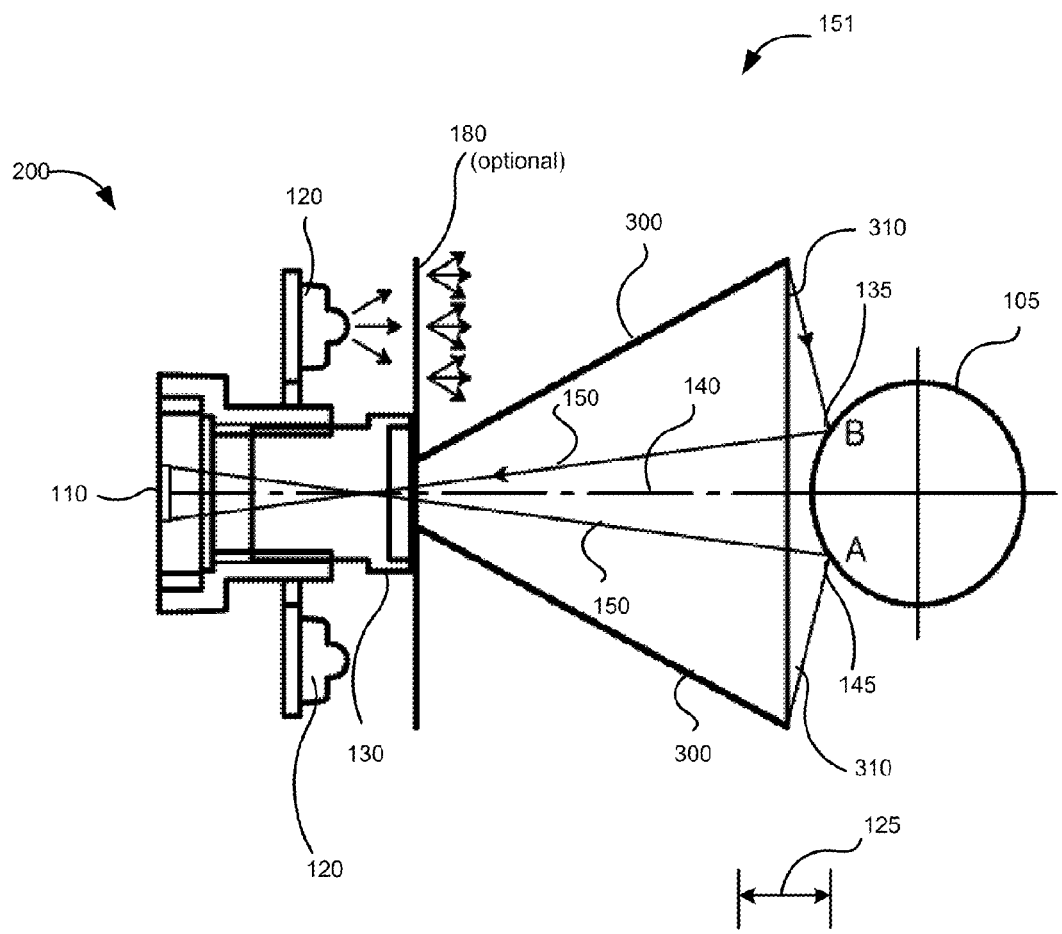
FIG. 5 is a schematic cross sectional view of an image formation system according an illustrative embodiment of the present technology.

FIG. 5 depicts an improved imaging system 200 according to the present technology that can be used as an image formation system 151 in a hand held scanning appliance 102. The improved system 200 has an imager 110 that is one of a variety of types of photosensitive imaging sensors, such as a CMOS or CCD device. A lens 130 disposed in front of the imager 110 is configured to direct illumination onto the imager 110. The imager 110 and lens 130 together form an optical axis 140 that defines the center of a field of view, which is bound by the polyhedral area defined as lines 150 in FIG. 5

At a given focus setting, a sharply focused image of the surface of the object 105 will be projected by the lens 130 onto the imager 110 when the object is positioned at an appropriate distance from the improved system 200. Optical properties of the system will affect the range of distance from which the object 105 can be positioned in front of the improved system 200 while projecting an image of the object 105 onto the imager 110 that exhibits features of sufficient sharpness and contrast so as to be perceived as a focused image. The range upon which a focused image can be formed on the imager 110 is a called the depth of field 125.

Illuminators 120 are shown in the improved system 200 for directing illumination towards the object 105. Optionally, a diffuser 180 can be used to diffuse the bright field illumination. In an illustrative embodiment of the present technology, a conical diffuser 300 is disposed between the lens 130 and the object 105. One skilled in the art will appreciate that while the illustrative embodiment describes a conical shaped diffuser 300, other embodiments can be employed with alternative shapes without departing from the scope of the technology. For example, parabolic, cylindrical, and hemispherical shaped diffusers can be used as a diffuser 300.

Figure 6:
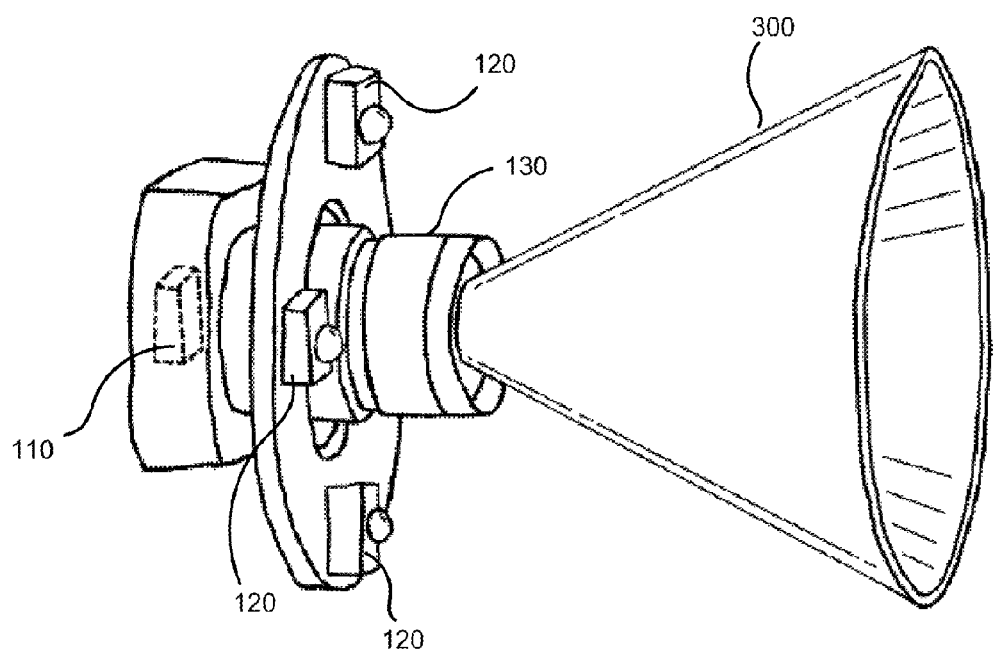
FIG. 6 is a perspective view of an illustrative embodiment of an image formation system according to the present technology.

FIG. 6 depicts a perspective view of the basic elements of the illustrative embodiment of the present technology. The conical diffuser 300 can be constructed from a translucent plastic material, such as polymethyl methacrylate (PMMA) with a roughened surface to achieve the optical property of translucency. In an embodiment of the technology, the optical properties of the diffuser 300 has translucency like that of ordinary white paper, in that illumination will cause the surface of the diffuser to appear bright. The conical diffuser 300 can be molded with a rough mold surface, or sandblasted to roughen the normally clear material to be translucent. The diffuser 300 is configured so that a first distal end, the narrow opening, of the diffuser surrounds the opening of the lens 130 and aligned with the imager 110 (shown in phantom). The illuminators 120 are distributed around the lens 130 so that an even distribution of illumination can be projected.

Referring back to FIG. 5, the entire field of view is illuminated with diffuse illumination since the second distal end of the diffuser 300 surrounds the field of view near the object 105. The maximum angle of illumination from the diffuser 300, shown as line 310 strikes the object 105 within the region defined as the field of view between point A 145 and point B 135, reflecting toward the lens 130 and the imager 110 as lines 150. Illumination from the diffuser that strikes the object outside of that region is outside the field of view, and therefore, not captured by the imager 110.

Figure 7:
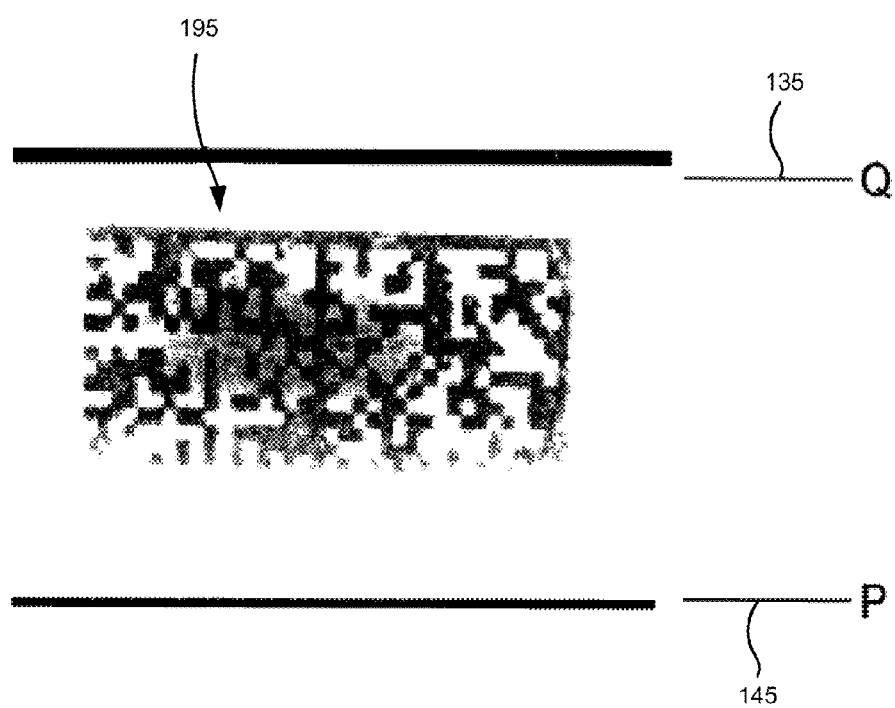
FIG. 7 is an image of a two dimensional symbol on a specular cylindrical object acquired using an image formation system according to the present technology.

Presenting the exemplary drill bit 190 (FIG. 3) to the improved imaging system 200, an image of the data matrix symbol 195 will be formed like that shown in FIG. 7. The entire data matrix symbol 195 is visible, since the region defined as the field of view between point A 145 and point B 135 receive diffuse illumination, and therefore, decoding algorithms operating on the image can readily extract the encoded information.

Figure 8:
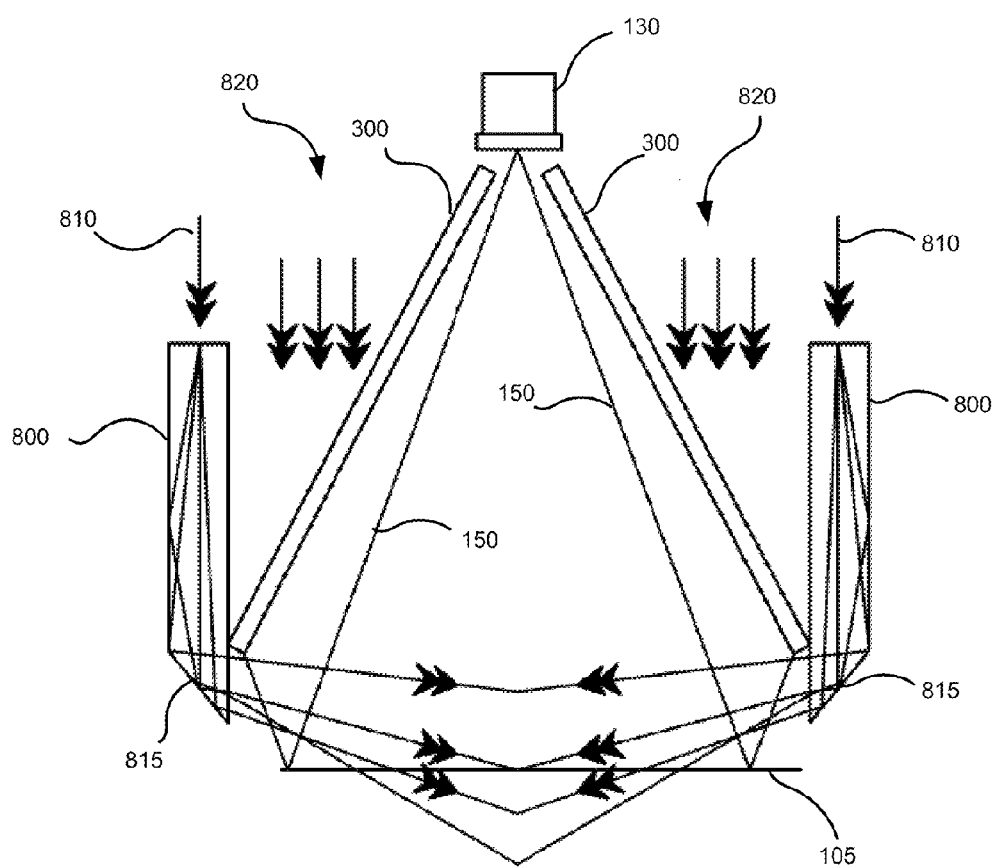
FIG. 8 is a schematic cross section of an illustrative embodiment of the present technology.

FIG. 8 shows another implementation of the diffuser 300 with a passive light pipe 800, shown in cross section relative to the lens 130, to provide diffuse illumination in combination with, or in the alternative to dark field illumination. Dark field illumination 810 is directed into the light pipe 800 that is internally reflected at a chamfered portion 815 to be directed at the object 105 at a low angle. Further information regarding the design and implementation of passive light pipes with selectively actuated illumination to provide dark field illumination can be found in commonly assigned U.S. Pat. No. 7,823,783, incorporated herein by reference. Bright field illumination 820 is converted into totally diffuse illumination by the diffuser 300, to project diffuse illumination on the object 105 within the field of view, depicted as the region defined by lines 150. Optionally, the diffuser 300 can be removably attached to the hand held scanning appliance 102 so that a user can operate the hand held scanning appliance using non-diffuse bright field illumination. The removability of the diffuser 300 can be achieved by incorporating snap-fit clearances and/or features in the diffuser and light pipe that permit removable assembly (not shown).

When dark field illumination is exclusively applied to the object 105 in the embodiment of the technology according to FIG. 8, scattered illumination may reflect from the object 105 and then from the diffuser 300 to unintentionally cause diffuse illumination on the object 105. This condition may be undesirable for reading certain parts that are best imaged with low angle dark field illumination, such as peened data matrix marks on a highly specular surface.

Figure 9:
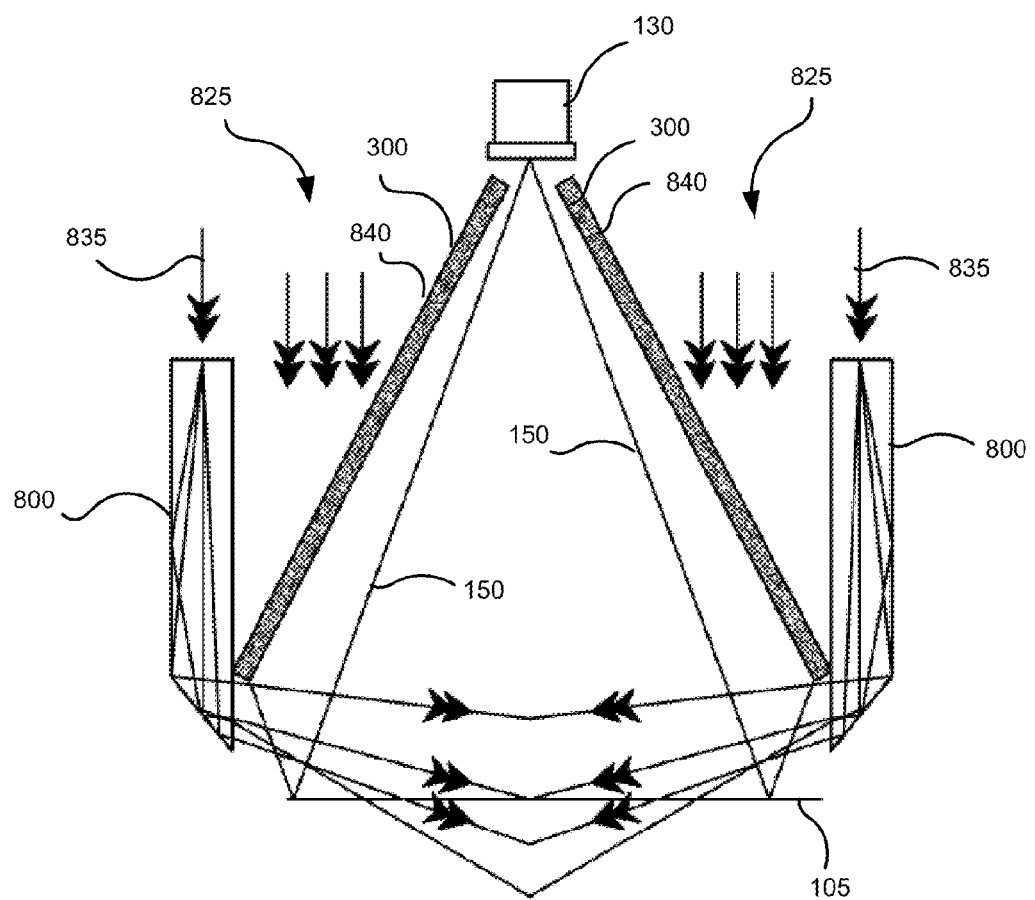
FIG. 9 is a schematic cross section of an illustrative embodiment of the present technology.

FIG. 9 shows an alternate embodiment of the implementation of the diffuser 300 with a passive light pipe 800, shown in cross section relative to the lens 130, to provide selectively exclusive dark field illumination or diffuse illumination. In this embodiment, a color specific dark field illumination 835 is projected into the light pipe 800. The diffuser 300 is fabricated with a material 840 having a color characteristic different from the color of the color specific dark field illumination 835, and illuminated with color specific bright field illumination 825 that matches the color characteristic of the material 840. In this embodiment, when the color specific dark field illumination is exclusively actuated, the low angle dark field illumination is projected onto the object 105, and any scattered illumination reflecting from the object 105 and then the diffuser 300 will not be converted into totally diffuse illumination.

In an illustrative embodiment according to FIG. 9, the color specific dark field illumination 835 is red, and the color specific bright field illumination is blue, with the material 840 having a blue color. In this embodiment, if only low angle dark field illumination is desired, the red dark field illumination 835 is turned on, with the blue bright field illumination turned off. The low angle red illumination striking the object, if scattered to reflect off the blue colored material 840 of the diffuser 300, will not appear bright in an image, and therefore not contribute to the illumination of the object with totally diffuse illumination. Conversely, if the blue bright field illumination 825 is turned on, the blue colored material 840 of the diffuser will transmit and diffuse the illumination to provide totally diffuse illumination of the object 105 within the field of view, depicted as the region defined by lines 150. One skilled in the art will appreciate that alternative color characteristics, such as red/infrared can be employed according to the illustrative embodiment of FIG. 9.

Figure 10:
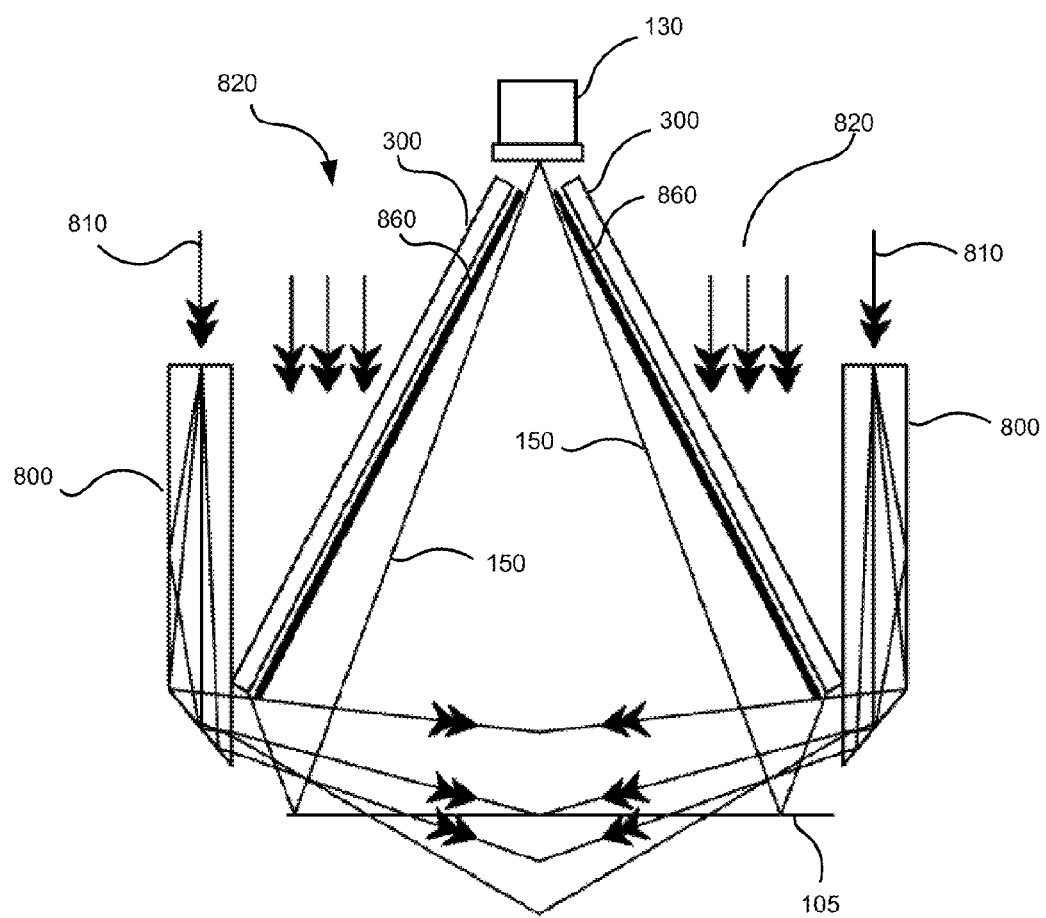
FIG. 10 is a schematic cross section of an illustrative embodiment of the present technology.

FIG. 10 shows another illustrative embodiment of the implementation of the diffuser 300 with a passive light pipe 800, shown in cross section relative to the lens 130, to provide selectively exclusive dark field illumination or diffuse illumination. In this illustrative embodiment, dark field illumination 810 is projected into the light pipe 800 to produce low angle dark field illumination while the bright field illumination 820 is turned off. A light absorbing foil 860, such as a neutral density filter material is applied to the interior surface of the diffuser 300. Low angle dark field illumination that reflects off the object 105 is absorbed by the foil filter 860 so that totally diffuse illumination is not reflected back onto the object. If diffuse illumination is desired, either instead of dark field illumination, or in combination with dark field illumination, the bright field illumination 820 is turned on. The intensity of the bright field illumination 820 would need to be increased to compensate for the absorption of such illumination by the foil filter 820. With the bright field illumination actuated, totally diffuse illumination will transmit from the diffuser 300, through the foil filter 860, and onto the object within the field of view, depicted as the region defined by lines 150.

Figure 11:
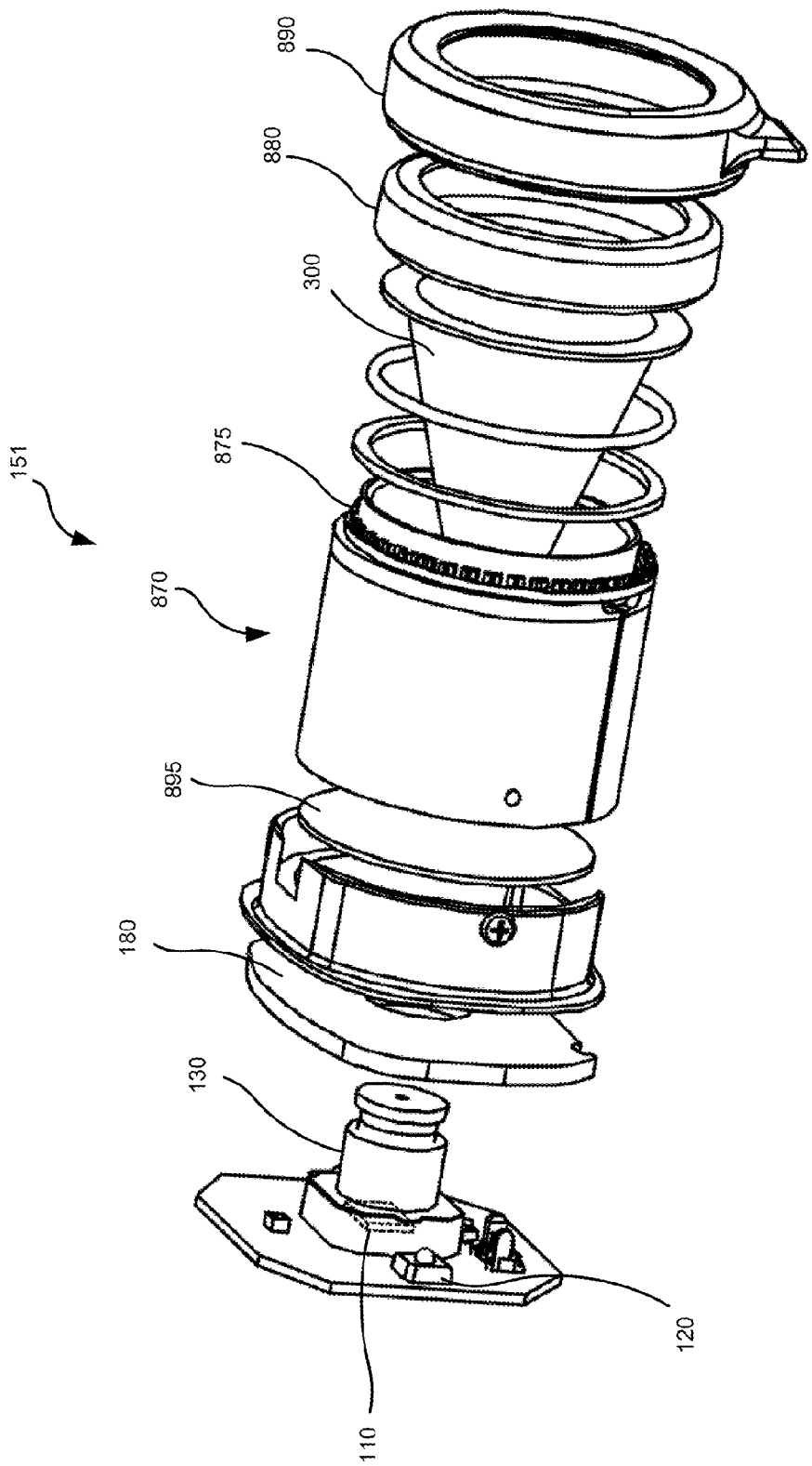
FIG. 11 is an exploded perspective view of an image formation system according to an illustrative embodiment of the present technology.

FIG. 11 depicts another illustrative embodiment of the implementation of the diffuser 300 as an image formation system 151 in a hand held scanning appliance 102. In the illustrative embodiment according to FIG. 11, the diffuser 300 is inserted into an active light pipe 870. The active light pipe 870 provides low angle dark field illumination from a ring of dark field illuminators 875, as disclosed in the commonly assigned International Patent Application WO02/075637, incorporated herein by reference. The dark field illuminators 875 are held in place with a threaded collar 880, and flexible sleeve 890. Bright field illuminators 120 project bright field illumination that is diffused by an optional diffuser 180, that is diffused over the entire field of view by the diffuser 300. A transparent window 895 protects the lens 130 and other internal components from the operating environment.

In the illustrative embodiment according to FIG. 11, the conical diffuser 300 can be positioned to diffuse the dark field illumination from the dark field illuminators 875, or optionally constructed to permit illumination from the dark field illuminators 875 to project onto the object at low angle without being diffused. This optional configuration can be achieved by inserting the conical diffuser 300 further into the active light pipe 870 toward the lens 130 to expose the dark field illuminators 875, or by constructing the conical diffuser 300 to have a transparent optical property at the distal end where it is disposed in front of the dark field illuminators 875.

When the hand held scanning appliance having an image formation system 151 according to the illustrative embodiment according to FIG. 11 is operated, the user can configure or select exclusive dark field illumination or exclusive diffuse illumination, or a combination of both modes of illumination thereof.

In the illustrative embodiment according to FIG. 11, the conical diffuser 300 can be optionally removed from the image formation system 151 so that the hand held scanning appliance 102 can be operated without diffuse illumination. This condition may be desired if high intensity non-diffuse bright field illumination, or if exclusive dark field illumination is required. The removable aspect of the diffuser 300 can be achieved by unscrewing the threaded collar 880 to remove the diffuser 300, and re-threading the collar 880 without the diffuser in place.

FIG. 12 shows a schematic representation of the effect of illuminating an object 105 having a highly specular surface 910 according to the present technology. The resulting image 920 will exhibit features 925 associated with a reflection of the lens 130. Though the field of view 930, as defined as the region bound by lines 150, will be illuminated with totally diffuse illumination from the diffuser 300, the image 920 will exhibit a darkened region of features 925 that is a reflection of light not emanating from the diffuser 300.

FIG. 13 shows an illustrative embodiment of the technology that further improves the uniform distribution of diffuse illumination over the field of view according to the present technology. Bright field illumination 820 is converted into totally diffuse illumination by the diffuser 300, to project diffuse illumination on the object 105 within the field of view, depicted as the region defined by lines 150. A semi-reflecting mirror 950 is disposed in front of the lens 130, and behind the diffuser at an appropriate angle so that the image of the field of view is projected into the lens 130. A second bright field illumination source 935 is directed toward the semi-reflecting mirror 950, with a second diffuser 940 disposed between the second illumination source 935 and the semi-reflecting mirror 950. The second diffuser 940 is composed of the same material as the diffuser 300, with the same translucent optical properties. One skilled in the art will appreciate that a single diffuser can be fabricated or molded that can provide the functionality of both the diffuser 300 and the second diffuser 940. The intensity of the second illumination source 935 may require an increased level during operation since a portion of the illumination 935 will not be reflected onto the object 105, but rather through the semi-reflecting mirror into the body of the hand held scanning appliance 102. By adjusting the intensity level of the second illumination 935, an even distribution of diffuse illumination can be achieved over the entire field of view 930.

Figure 14:
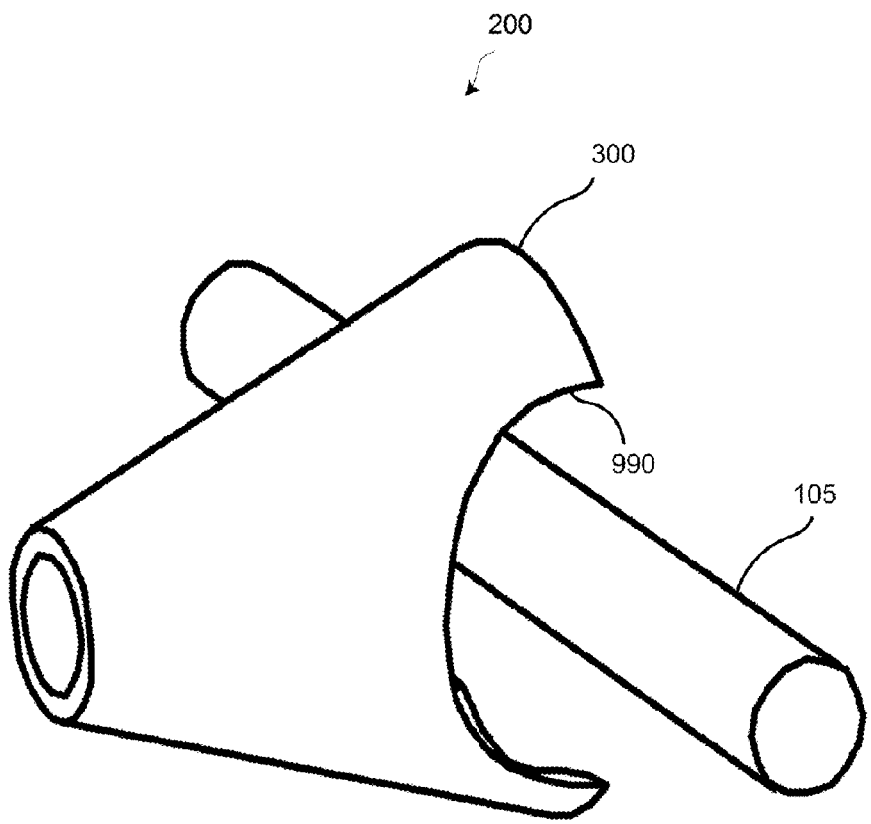
FIG. 14 is a perspective view of an illustrative embodiment of the present technology with the diffuser according to the technology adapted with a cylindrical shape.

FIG. 14 shows an illustrative embodiment of the technology that provides a cylindrical shape 990 in the diffuser 300 so that an object 105 having an extended length can be presented to the improved imaging system 200. The cylindrical shape 990 of the diffuser provides relief so that the diffuser 300 can increase an area of diffuse illumination pattern on a reflective cylindrical object. Further, the cylindrical shape 990 provides an aiming assistance to the user.

Figure 15:
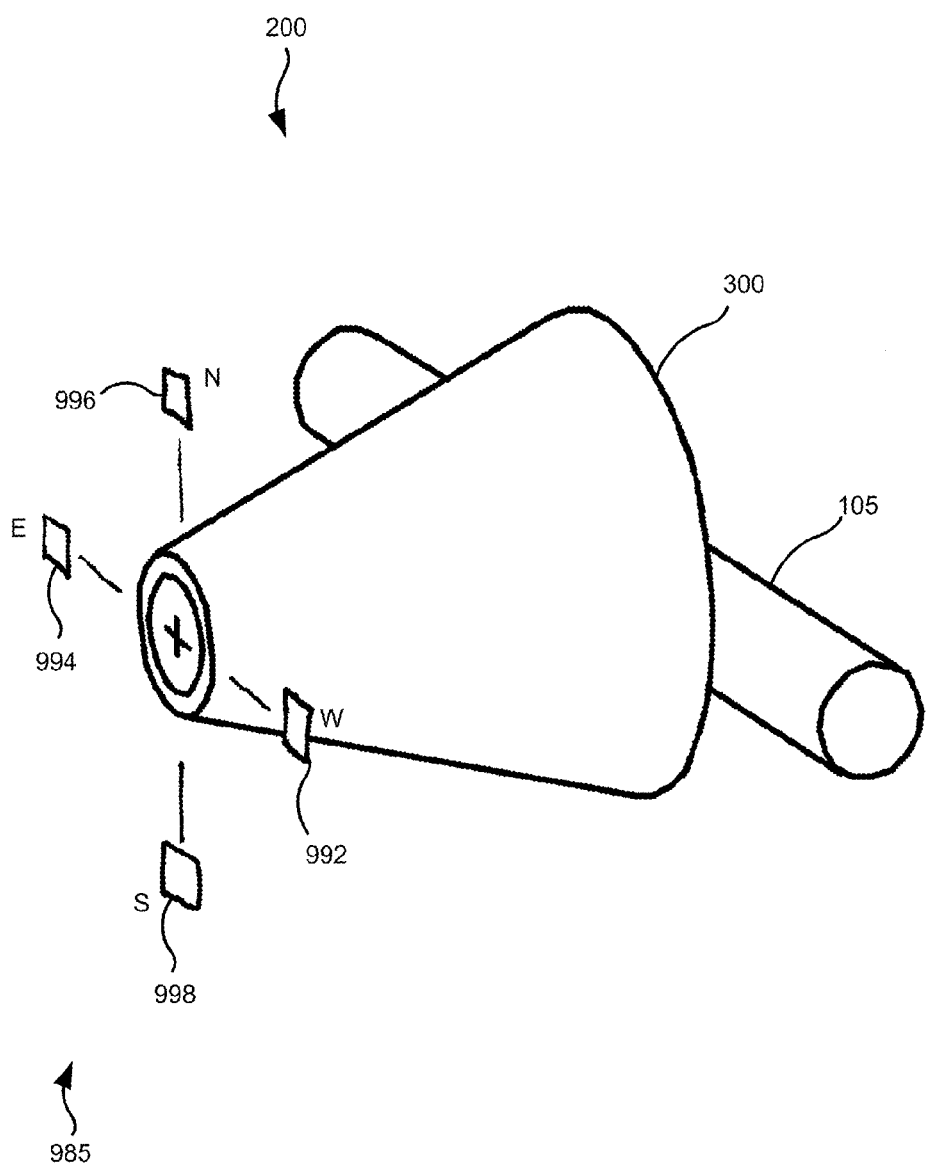
FIG. 15 is a perspective view of an illustrative embodiment of the present technology with selective quadrant diffuse illumination.

FIG. 15 shows a plurality of selectively actuated illuminators 985 that can provide selective illumination of the diffuser 300. In this illustrative embodiment, the North illuminator 996 can be actuated with the South illuminator 998 while the East illuminator 994 and the West illuminator 992 are not actuated. Conversely, the East illuminator 994 and the West illuminator 992 can be actuated while the North illuminator 996 and the South illuminator 998 are not actuated. Selective quadrant illumination according to this illustrative embodiment permits an adjustment, or compensation, of the uniformity of the illumination that is converted into totally diffuse illumination by the diffuser 300, on an axis parallel with the axis of a specular object 105.

Figure 16:
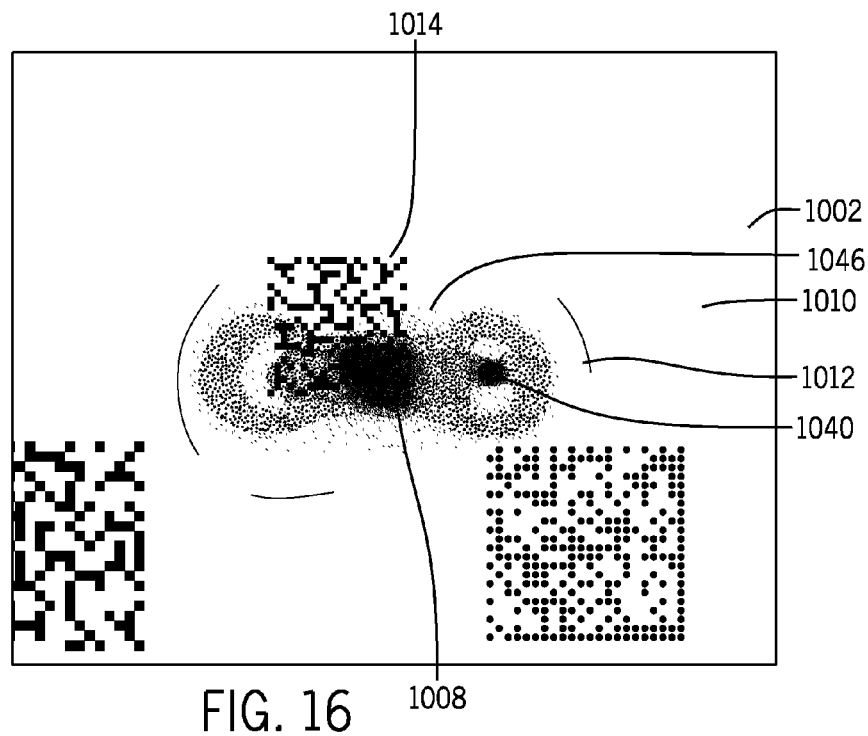
FIG. 16 is an image of a two dimensional symbol on a specular object, and showing an undesirable darkened region and an aimer pattern.

FIG. 16 shows an image 1002 where an aperture 1004 in the diffuser 300 (see FIG. 12) causes a darkened region 1008 in the background of the image 1002 when the object 1010 has a highly specular surface 1012. The darkened region 1008 can be seen in the image 1002 generally in the lower right hand corner of the two dimensional symbol 1014. The darkened region 1008 appears in the background of the image, which can cause problems with the image processing. The darkened region 1008 is the result of a reflection of the lens 130 passing through the aperture 1004 in the diffuser 300. Although the field of view 930, as defined as the region bound by lines 150 (see FIGS. 12 and 13, for example), will be illuminated with diffuse illumination from the diffuser 300, the image 1002 will exhibit the darkened region 1008 due to the reflection of light off the lens and not emanating from the diffuser 300.

Figure 17:
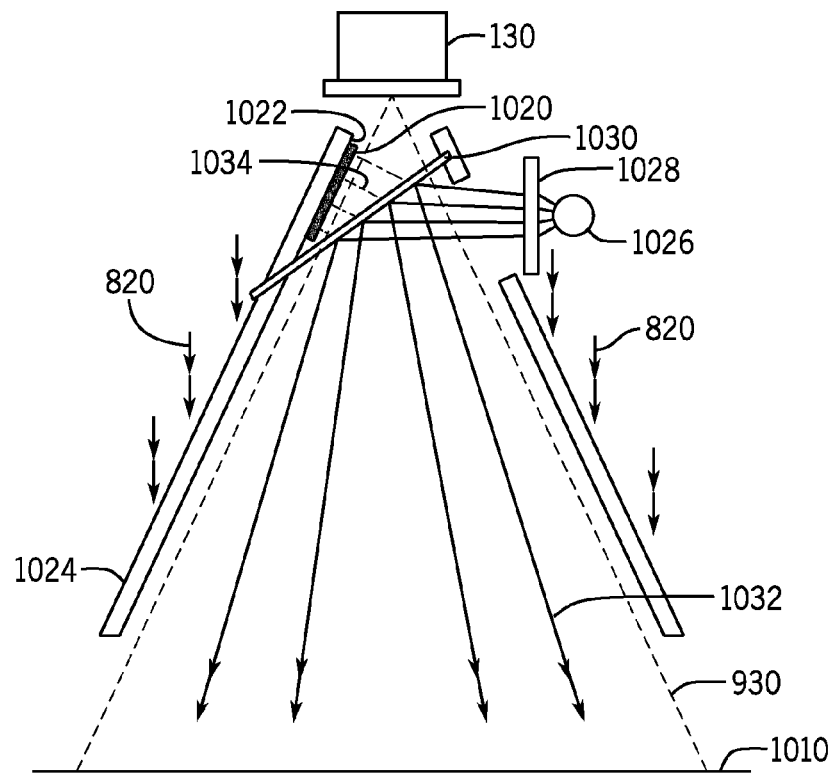
FIG. 17 is a schematic cross section of an illustrative embodiment of the present technology, and showing use of a darkened section to substantially eliminated the darkened region.
Figure 18:
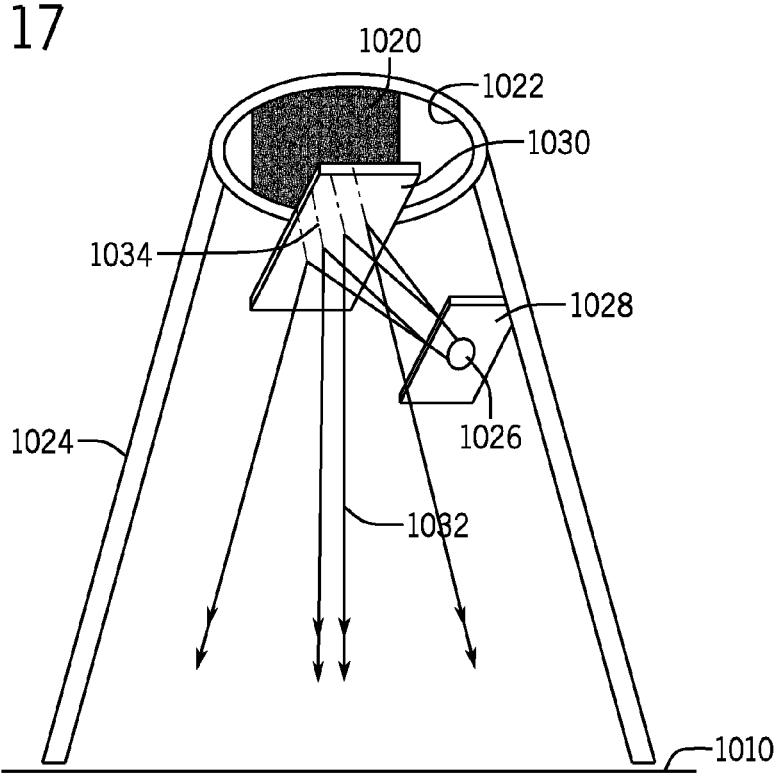
FIG. 18 is perspective view of the illustrative embodiment of FIG. 17.

FIGS. 17 and 18 show an illustrative embodiment of the technology that includes a diffuser 1024 having a darkened section 1020. The darkened section 1020 can be on an inside surface 1022, an outside surface 1023, both surfaces, and/or the darkened section 1020 can be generally opaque. The darkened section 1020 can be integral with the diffuser 1024, e.g., etched into or onto the surface, or the darkened section can be applied to the diffuser, such as with dark paint or tape, as non-limiting examples. An additional illumination source 1026 with an optional side diffuser 1028 can be directed towards a semi-reflecting mirror 1030. The illumination source can be a bright field illumination source, for example. Because the mirror 1030 is semi-reflecting, some light 1034 passes through the mirror and can reflect off of the inside surface 1022 of the diffuser 1024. The reflected diffused light 1032 can be directed toward the object 1010. The darkened section 1020 can be included and placed specifically where the portion of light 1034 passing through the semi-reflecting mirror 1030 would hit the inside surface of the diffuser 1024. The darkened section 1020 helps to absorb the non-reflected light 1034 and prevent stray light and ghost images, substantially reducing any undesirable reflected light that would not be diffused by the diffuser 1024.

By adjusting the intensity level of the additional illumination source 1026, the dark spot 1008 in the background of the image 1002 can be substantially reduced or eliminated. During testing and development, it has been found that an optimization of the mirror 1030 to be about 80 percent transmission and about 20 percent reflective mirror can increase the efficiency of the system. For example, when an 80/20 percent reflective mirror is used, 20 percent of the light that is intended to reach the camera image sensor 110 is reflected to the darkened section 1020 and gets absorbed. The light that is intended to reach the camera image sensor 110 can be provided from the bright field illumination 820 that illuminates the field of view via the diffuser 1024. The intensity of the bright field illumination 820 can be higher than the intensity of the illumination source 1026 that can be used to illuminate the semi-reflecting mirror 1030 to eliminate the dark spot 1008. The inventors have found that about five times the illumination power for the diffuse bright field illumination 820 compared to the illumination power for the additional illumination source 1026 provides the most efficient arrangement to eliminate the dark spot 1008, although other illumination powers can be used for other applications. This arrangement provides a system where the more illumination that gets lost by reflection of the semi-reflecting mirror 1030, the more illumination power can be provided to the imaging system.

Figure 19:
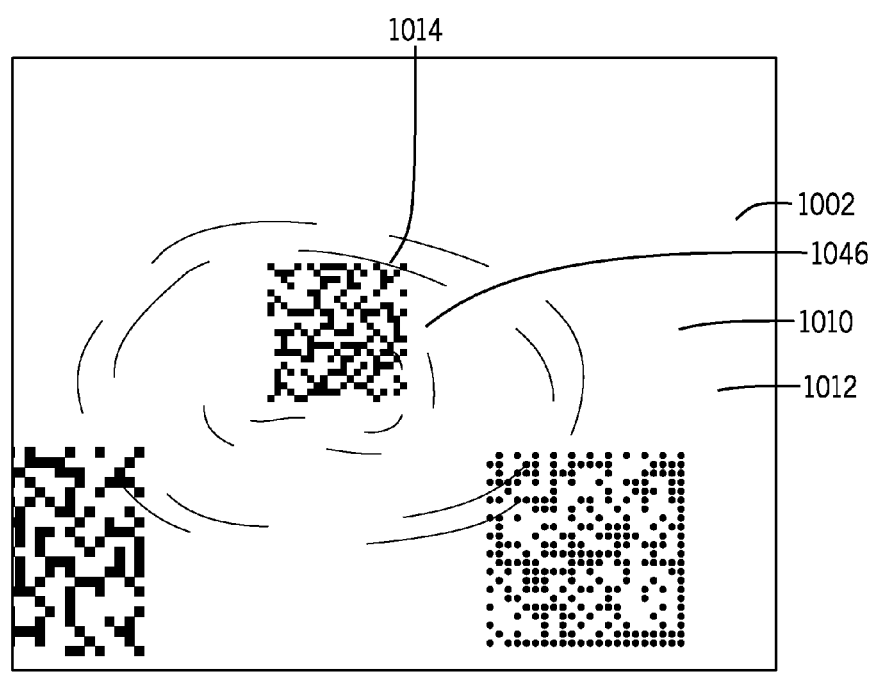
FIG. 19 is another image of the two dimensional symbol shown in FIG. 16, except acquired using an image formation system according to the present technology that substantially eliminated the darkened region.

FIG. 19 is an image of the two dimensional symbol shown in FIG. 16, except acquired using an image formation system according to the present technology. As can be seen, the darkened region 1008 in the background of the image 1002 has been substantially reduced or eliminated.

Figure 20:
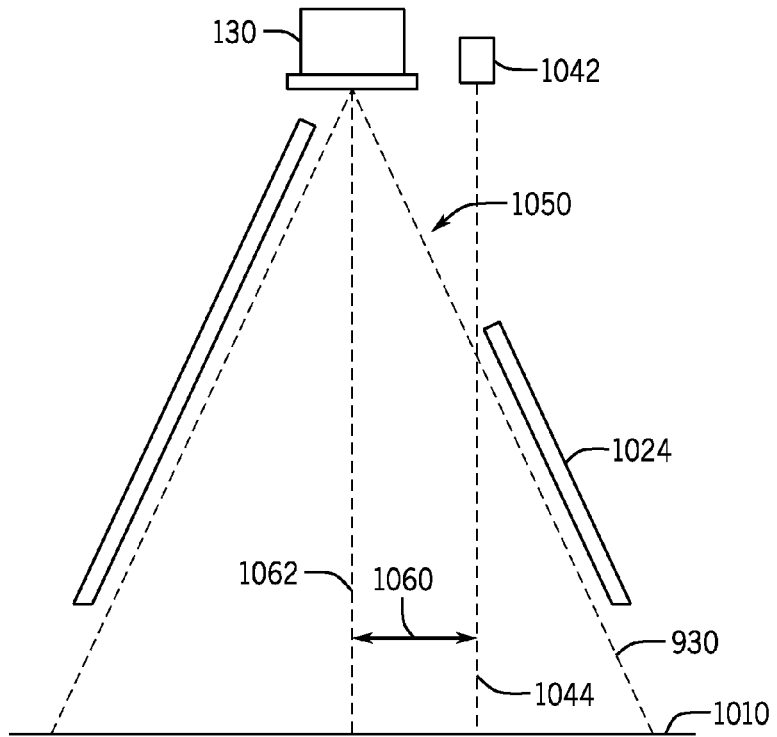
FIGS. 20 and 21 are schematic cross sections of an image formation system including a diffuser with a large aperture (FIG. 20) and an additional aperture (FIG. 21) required for an aimer beam.
Figure 21:
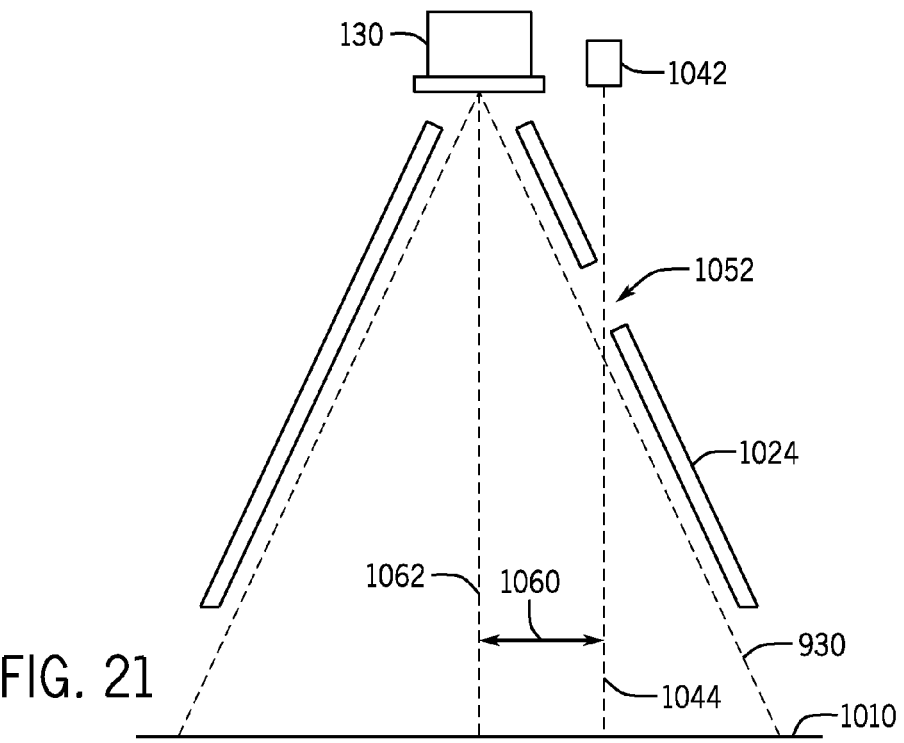

Referring again to FIG. 16, an aimer pattern 1040 can also be seen in the image 1002. Using an illumination source 1042, an aimer beam 1044 can be projected onto the object 1010 to mark a region such as an edge or center 1046 of the field of view 930. It can be desirable to have an aimer pattern 1040 generally as near as possible to the camera's optical axis 1062 (see FIG. 20, for example) to create the aimer pattern 1040 as near as possible to the center 1046 of the field of view 930. It is important to recognize that the illumination source 1042 must physically remain outside the field of view 930 so it does not interfere with any illumination returning to the lens 130. In order to provide the aimer pattern 1040 when a diffuser 300 is used, the diffuser 300 would require an even larger aperture 1050 (see FIG. 20) or an additional second aperture 1052 (see FIG. 21) to allow illumination, e.g., the aimer beam 1044, from the illumination source 1042 to provide the aimer pattern 1040 on the object 1010 without passing through the diffuser 1024. As can be seen in FIGS. 20 and 21, the offset 1060 between the camera's optical axis 1062 and the aimer beam 1044 can be substantial, providing an inaccurate representation of the center 1046 of the field of view 930.

Figure 22:
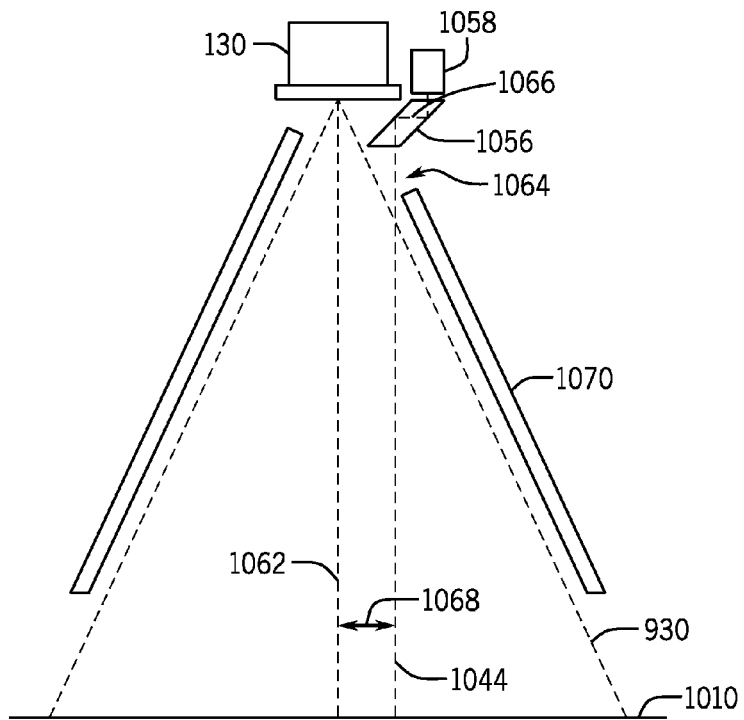
FIG. 22 is a schematic cross section of an illustrative embodiment of the present technology, and showing use of a light guide and associated illumination source to reduce an offset between the camera axis and the aimer beam.

FIG. 22 shows an illustrative embodiment of the technology that includes a light guide 1056 and associated illumination source 1058 to generate an aimer beam 1044. Use of the light guide 1056 and illumination source 1058 can reduce the offset 1068 between the camera's optical axis 1062 and the aimer beam 1044. In the embodiment shown, after internal reflections 1066 inside the light guide 1056, the aimer beam 1044 can have the same direction of travel as the aimer beam 1044 directly from the illumination source 1058, but at the smaller offset 1068 from the camera axis 1062, thereby providing a more accurate indication of the center of the field of view 930.

Other light guide arrangements and shapes are within the scope of the technology including straight, curved, trapezoidal, parallelogram, and tubular shaped light guides, and less than two or more than two internal reflections. The illumination source 1058 can be any of a variety of known illumination sources, including an LED or a laser, as non-limiting examples.

By using a light guide 1056 to move the aimer beam 1044 closer to the camera axis 1062, the opening 1064 in the diffuser 1070 can be made smaller, and the smaller opening 1064 can help to prevent stray light and ghost images, substantially reducing any undesirable reflected light that would not be diffused by the diffuser 1070.

Figure 23:
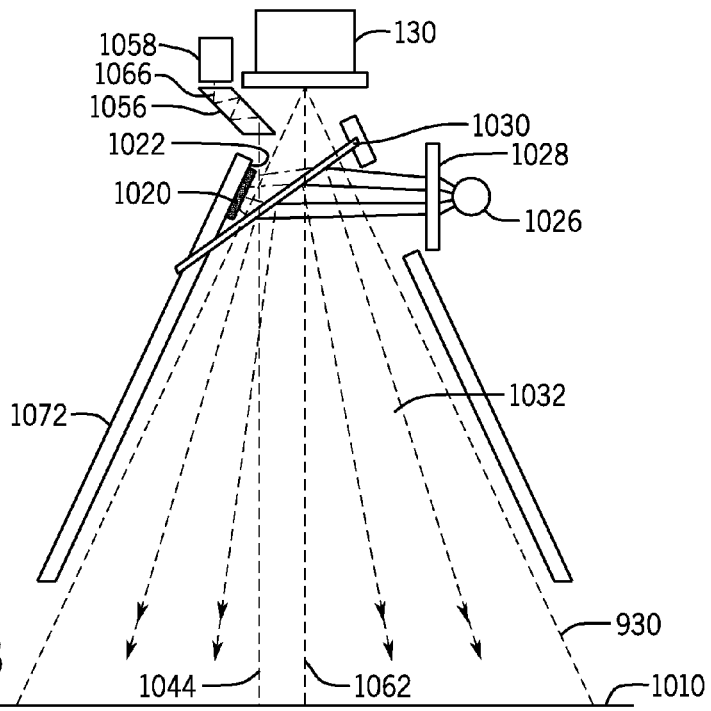
FIG. 23 is a schematic cross section of an illustrative embodiment of the present technology similar to FIG. 22, and including a light guide and associated illumination source to reduce an offset between the camera axis and the aimer beam, along with a darkened section to substantially eliminate the darkened region.

FIG. 23 shows an illustrative embodiment that includes a darkened section 1020 on an inside surface 1022 of the diffuser 1072 and a light guide 1056 and associated illumination source 1058. Both the darkened section 1020 and the light guide 1056 combined in one system can further help to prevent stray light and ghost images, substantially reducing any undesirable reflected light that would not be diffused by the diffuser 1072.

While the technology has been described with reference to certain illustrated embodiments, the words which have been used herein are words of description rather than words of limitation. Changes may be made, within the purview of the appended claims, without departing from the scope and spirit of the technology and its aspects. Although the technology has been described herein with reference to particular structures, acts and materials, the technology is not to be limited to the particulars disclosed, but rather extends to all equivalent structures, acts, and materials, such as are within the scope of the appended claims.

What is claimed is:

1. An apparatus for imaging a symbol on an object, the apparatus comprising:
   a portable imaging system having an imager, the imager defining a field of view and an optical axis;
   an illuminator to direct illumination towards a region of interest, the region of interest being an intended position of the symbol on the object;

a tapered translucent diffuser concentrically aligned with the optical axis, having a first distal end proximate to the imager, and a second distal end proximate to the region of interest, the tapered translucent diffuser tapering along the length of the tapered translucent diffuser from the first end toward the second end; and the tapered translucent diffuser including a darkened section, the darkened section to absorb a portion of the illumination to substantially reduce reflection of the portion of the illumination toward the object.

2. The apparatus according to claim 1, further including an additional illuminator directed towards a semi-reflecting mirror, where the darkened region absorbs at least a portion of illumination not reflected by the semi-reflecting mirror.

3. The apparatus according to claim 2 further including a side diffuser to diffuse additional illumination from the additional illuminator.

4. The apparatus according to claim 1, wherein the darkened region is closer to the first distal end than the second distal end.

5. The apparatus according to claim 1, wherein the darkened region is substantially opaque.

6. The apparatus according to claim 1, wherein the tapered translucent diffuser has a first color characteristic and wherein the illuminator emits illumination having a color characteristic that matches the first color characteristic.

7. The apparatus according to claim 1, wherein the tapered translucent diffuser is composed of polymethyl methacrylate.

8. The apparatus according to claim 1, wherein the illumination directed towards the region of interest is diffused by the translucent diffuser to provide diffuse illumination to the field of view.

9. The apparatus according to claim 1, wherein the diffuser has a distal edge adjacent the region of interest and wherein the distal edge forms a recess in which at least a portion of an object including the symbol to be imaged is receivable.

10. The apparatus according to claim 1, wherein the illuminator further comprises a plurality of selectively actuated illuminators.

11. The apparatus according to claim 10, wherein the plurality of selectively actuated illuminators have a north-south and east-west selective actuation.

12. The apparatus according to claim 1, wherein illuminator light passes through the transparent diffuser toward the region of interest.

13. The apparatus according to claim 1, further comprising a light absorbing filter applied to the diffuser and disposed between the diffuser and the region of interest.

14. An apparatus for imaging a symbol on an object, the apparatus comprising:
a hand-held portable imaging system having an imager, the imager defining a field of view and an optical axis;
an illuminator to direct illumination towards a region of interest, the region of interest being an intended position of the symbol on the object;
a tapered translucent diffuser concentrically aligned with the optical axis, having a first distal end proximate to the imager, and a second distal end proximate to the region of interest, the translucent diffuser tapering along the length of the tapered translucent diffuser from the first end toward the second end;
a light guide proximate the first distal end and the imager; and
a second illuminator, the second illuminator to generate an aimer beam that passes through the light guide to produce an aimer pattern on the object.

15. The apparatus according to claim 14, wherein the aimer beam internally reflects within the light guide to maintain a substantially parallel relationship to the optical axis.

16. The apparatus according to claim 14, wherein the light guide internally reflects the aimer beam to move the aimer beam closer to the optical axis.

17. The apparatus according to claim 14, further including a semi-reflecting mirror disposed in front of a lens aligned with the optical axis configured to direct at least a portion of illumination reflected from the region of interest into the lens;
a second illuminator directing illumination at the semi-reflecting mirror so that at least a portion of the illumination from the second illuminator is directed towards the region of interest; and
a second diffuser disposed between the second illuminator and the semi-reflecting mirror.

18. The apparatus according to claim 17, wherein the illuminator has a first intensity, and the second illuminator has a second intensity, so as to configure the apparatus to produce a uniform distribution of illumination over the field of view at the region of interest.

19. The apparatus according to claim 17, wherein the illuminator and the second illuminator have different intensities.

20. The apparatus according to claim 14, wherein the illumination from the illuminator that is directed towards the region of interest is diffused by the translucent diffuser to provide diffuse illumination to the field of view.

21. An apparatus for imaging an object, the apparatus comprising:
a hand-held portable imaging system having an imager, the imager defining a field of view and an optical axis;
a first illuminator to direct illumination towards a region of interest, the region of interest being an intended position of the object;
a tapered translucent diffuser concentrically aligned with the optical axis, having a first distal end proximate to the imager, and a second distal end proximate to the region of interest, the tapered translucent diffuser tapering along the length of the tapered translucent diffuser from the first end toward the second end;
the tapered translucent diffuser including a darkened region, the darkened region to absorb a portion of the illumination to substantially reduce reflection of the portion of the illumination toward the object;
a light guide proximate the first distal end and the imager; and
a second illuminator, the second illuminator to generate an aimer beam that passes through the light guide to produce an aimer pattern on the object.

22. The apparatus according to claim 21, wherein the light guide is parallelogram shaped.

* * * * *